(12) United States Patent
Fukuoka et al.

(10) Patent No.: US 8,027,278 B2
(45) Date of Patent: Sep. 27, 2011

(54) WIRELESS COMMUNICATION BASE STATION APPARATUS, WIRELESS COMMUNICATION MOBILE STATION APPARATUS, AND METHOD FOR MAPPING RESPONSE SIGNAL IN ARQ

(75) Inventors: Masaru Fukuoka, Ishikawa (JP);
Akihiko Nishio, Kanagawa (JP);
Katsuhiko Hiramatsu, Leuven (BG);
Kenichi Kuri, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 86 days.

(21) Appl. No.: 12/524,660

(22) PCT Filed: Jan. 31, 2008

(86) PCT No.: PCT/JP2008/051512
§ 371 (c)(1),
(2), (4) Date: Jul. 27, 2009

(87) PCT Pub. No.: WO2008/093774
PCT Pub. Date: Aug. 7, 2008

(65) Prior Publication Data
US 2010/0113007 A1    May 6, 2010

(30) Foreign Application Priority Data

Feb. 2, 2007  (JP) ................. 2007-024636
Jun. 7, 2007  (JP) ................. 2007-151658
Aug. 14, 2007 (JP) ................. 2007-211546

(51) Int. Cl.
*H04B 7/005* (2006.01)
(52) U.S. Cl. ........................ 370/278; 455/522
(58) Field of Classification Search ............. 455/522; 370/278
See application file for complete search history.

(56) References Cited

U.S. PATENT DOCUMENTS
2004/0058700 A1 * 3/2004 Nilsson et al. ............. 455/522

OTHER PUBLICATIONS

"Modifications of Uptink Synchronous HARQ scheme," LG Electronics, 3GPP RAN WG1 Meeting document R1-070245, Jan. 2007, pp. 1-5.*
International Search Report dated Mar. 25, 2008.
"Modifications of Uplink Synchronous HARQ scheme," LG Electronics, 3GPP RAN WG1 Meeting document R1-070245, Jan. 2007, pp. 1-5, p. 2 line 15.

(Continued)

*Primary Examiner* — Jason Mattis
*Assistant Examiner* — Joseph Bednash
(74) *Attorney, Agent, or Firm* — Dickinson Wright PLLC

(57) ABSTRACT

In ARQ where a plurality of mobile stations share and use a single channel for response signals (ACK/NACK signals), a wireless communication base station apparatus can prevent failure of the ARQ control. In this apparatus, a CRC part (114) performs an error detection using CRC for an uplink data, and generates, as a response signal, an ACK signal in a case of CRC=OK or a NACK signal in a case of CRC=NG. A retransmittal determining part (115) determines whether the response signal is for an initially transmitted data or for a retransmitted data. A constellation control part (116) controls, in accordance with a determination result of the retransmittal determining part (115), a constellation pattern to be used in a modulation in a modulating part (105). The modulating part (105) modulates the response signal for the retransmitted data in accordance with the constellation pattern controlled by the constellation control part (116), that is, a constellation pattern obtained by reversing the constellation pattern of the response signal for the initially transmitted data.

6 Claims, 25 Drawing Sheets

OTHER PUBLICATIONS

"Collision Avoidance While Using Synchronous HARQ," CATT, RITT, 3GPP TSG-RAN WG2#56bis Meeting document R2-070115, Jan. 2007, pp. 1-4.

"ACK/NAK Channel Transmission in E-UTRA Downlink," 3GPP TSG RAN WG1#47bis Meeting document R1-070277, Jan. 2007, pp. 1-9.

* cited by examiner

| MOBILE STATION 1 | PATTERN A |
|---|---|
| MOBILE STATION 2 | PATTERN B |
| MOBILE STATION 3 | PATTERN C |
| MOBILE STATION 4 | PATTERN D |

FIG.12

|  | INITIAL TRANSMISSION | RETRANSMISSION (FIRST TIME) | RETRANSMISSION (SECOND TIME) | RETRANSMISSION (THIRD TIME) |
|---|---|---|---|---|
| MOBILE STATION 1 | PATTERN A | PATTERN B | PATTERN C | PATTERN D |
| MOBILE STATION 2 | PATTERN B | PATTERN D | PATTERN C | PATTERN A |
| MOBILE STATION 3 | PATTERN C | PATTERN B | PATTERN A | PATTERN D |
| MOBILE STATION 4 | PATTERN D | PATTERN C | PATTERN B | PATTERN A |

FIG.15

| SCRAMBLING CODE | C1 | C2 | C3 | C4 |
|---|---|---|---|---|
| INITIAL TRANSMISSION | SC#1 | 1 | 1 | 1 | 1 |
| RETRANSMISSION (FIRST TIME) | SC#2 | 1 | 1 | -1 | -1 |
| RETRANSMISSION (SECOND TIME) | SC#3 | 1 | -1 | 1 | -1 |
| RETRANSMISSION (THIRD TIME) | SC#4 | 1 | -1 | -1 | 1 |

FIG.27

WIRELESS COMMUNICATION BASE STATION APPARATUS, WIRELESS COMMUNICATION MOBILE STATION APPARATUS, AND METHOD FOR MAPPING RESPONSE SIGNAL IN ARQ

TECHNICAL FIELD

The present invention relates to a radio communication base station apparatus, radio communication mobile station apparatus and response signal mapping method in ARQ.

BACKGROUND ART

Conventionally, in mobile communication, ARQ (Automatic Repeat Request) is applied to uplink data transmitted from a radio communication mobile station apparatus (hereinafter simply "mobile station") to a radio communication base station apparatus (hereinafter simply "base station") in uplink, and a response signal showing uplink data error detection result is fed back to the mobile station in downlink. CRC (Cyclic Redundancy Check) is performed for the uplink data, and, if CRC=OK (no error), an ACK (Acknowledgment) signal is fed back, and, if CRC=NG (error), a NACK (Negative Acknowledgment) signal is fed back as a response signal to the mobile station.

Recently, to use downlink communication resources efficiently, studies are underway to limit the channels to transmit response signals in downlink to one, and are conducted about ARQ in which this one channel is shared and used by a plurality of mobile stations. Further, in this ARQ, the base station having received uplink data feeds back a response signal to the mobile station after the elapse of a predetermined time period. When a NACK signal is fed back from the base station, the mobile station having received the NACK signal retransmits uplink data to the base station after the elapse of a predetermined time period. Further, in this ARQ, information showing to which mobile station a response signal is addressed does not accompany the response signal (see Non-patent Document 1).
Non-patent Document 1: 3GPP RAN WG1 Meeting document, R1-070245, "Modifications of Uplink Synchronous HARQ scheme," LG Electronics

DISCLOSURE OF INVENTION

Problems to be Solved by the Invention

FIG. 1 specifically shows a sequence diagram of the above ARQ studied recently. In the following explanation, the base station having received uplink data feeds back a response signal to the mobile station after the elapse of one TTI (Transmission Time Interval). The mobile station having received the NACK signal retransmits uplink data to the base station after the elapse of one TTI.

First, at time t1, the base station transmits allocating information showing uplink data channel is to be allocated to mobile station 1.

Mobile station 1 having received this allocating information transmits uplink data for the first time at time t3.

The base station having received the uplink data from mobile station 1 performs a CRC on this uplink data. If CRC=OK (no error), the base station feeds back an ACK signal at time t5 and transmits allocating information showing the uplink data channel is to be allocated to mobile station 2.

Mobile station 1 transmitted uplink data for the first time at time t3, and therefore determines that the ACK signal fed back from the base station at time t5 is for mobile station 1 and receives the ACK signal. However, due to the influence of poor downlink channel quality at this time for example, mobile station 1 demodulates the feedback ACK signal as a NACK signal by mistake. Consequently, mobile station 1 retransmits uplink data at time t7 (for the first time).

Meanwhile, mobile station 2 having received allocating information transmits uplink data for the first time at time t7.

In this way, when mobile station 1 demodulate an ACK signal as a NACK signal by mistake, a collision occurs between retransmission data from mobile station 1 and the initial transmission data from mobile station 2, and, as a result, the CRC result in the base station is more likely to be NG (error). Consequently, the base station feeds back a NACK signal at time t9.

Mobile station 1 retransmitted uplink data at time t7, and therefore determines that the NACK signal fed back from the base station at time t9 is for mobile station 1 and receives the NACK signal. Consequently, mobile station 1 retransmits uplink data at time t11 (for a second time).

Meanwhile, mobile station 2 transmitted uplink data for the first time at time t7, and therefore determines that the NACK signal fed back from the base station at time t9 is for mobile station 2 and receives the NACK signal. Consequently, mobile station 2 also retransmits uplink data at time t11 (for the first time).

Then, as described above, a collision occurs between retransmission data from mobile station 1 and the retransmission transmission data from mobile station 2, and, as a result, the CRC result in the base station is more likely to be NG (error). Consequently, the base station feeds back a NACK signal at time t13.

Subsequently, the sequence of processes, including uplink data transmission from both mobile stations, collision of uplink data, CRC=NG (error), feedback of a NACK signal and transmission of uplink data from both mobile stations, is repeated, and therefore ARQ control does not operate.

In this way, in ARQ, in which a plurality of mobile stations share and use one channel for response signals, there is a problem of failing ARQ control once the mobile station receives an ACK signal as a NACK signal by mistake.

It is therefore an object of the present invention to provide, in ARQ, in which a plurality of mobile stations share and use one channel for response signals, a base station, a mobile station and a response signal mapping method in ARQ that can prevent failure of ARQ control.

Means for Solving the Problem

The base station of the present invention adopts a configuration including: an error detection section that performs error detection, and generates a first response signal to initial transmission data and a second response signal to retransmission data; and a modulation section that maps the second response signal representing a different content from the first response signal, to a same decision region in a constellation as a decision region for the first response signal, and maps the second response signal representing the same content as the first response signal to a different decision region in the constellation from the decision region for the first response signal, to modulate the first response signal and the second response signal.

The mobile station of the present invention adopts a configuration including: a receiving section that receives a first response signal to initial transmission data and a second response signal to retransmission data; and a demodulation section that switches decision regions in the constellation between the first response signal and the second response signal, to demodulate the first response signal and the second response signal.

Advantageous Effect of the Invention

According to the present invention, in ARQ, in which a plurality of mobile stations share and use one channel for response signals, it is possible to prevent failure of ARQ control.

BRIEF DESCRIPTION OF DRAWINGS

FIG. 12 is an assignment example of constellation patterns according to Embodiment 2;
FIG. 15 is an assignment example of the constellation patterns according to Embodiment 2;
FIG. 27 illustrates an example of scrambling codes associated with the number of retransmissions according to Embodiment 4.

BEST MODE FOR CARRYING OUT THE INVENTION

Now, embodiments of the present invention will be described in detail with reference to the accompanying drawings.

Embodiment 1

Figure 2:
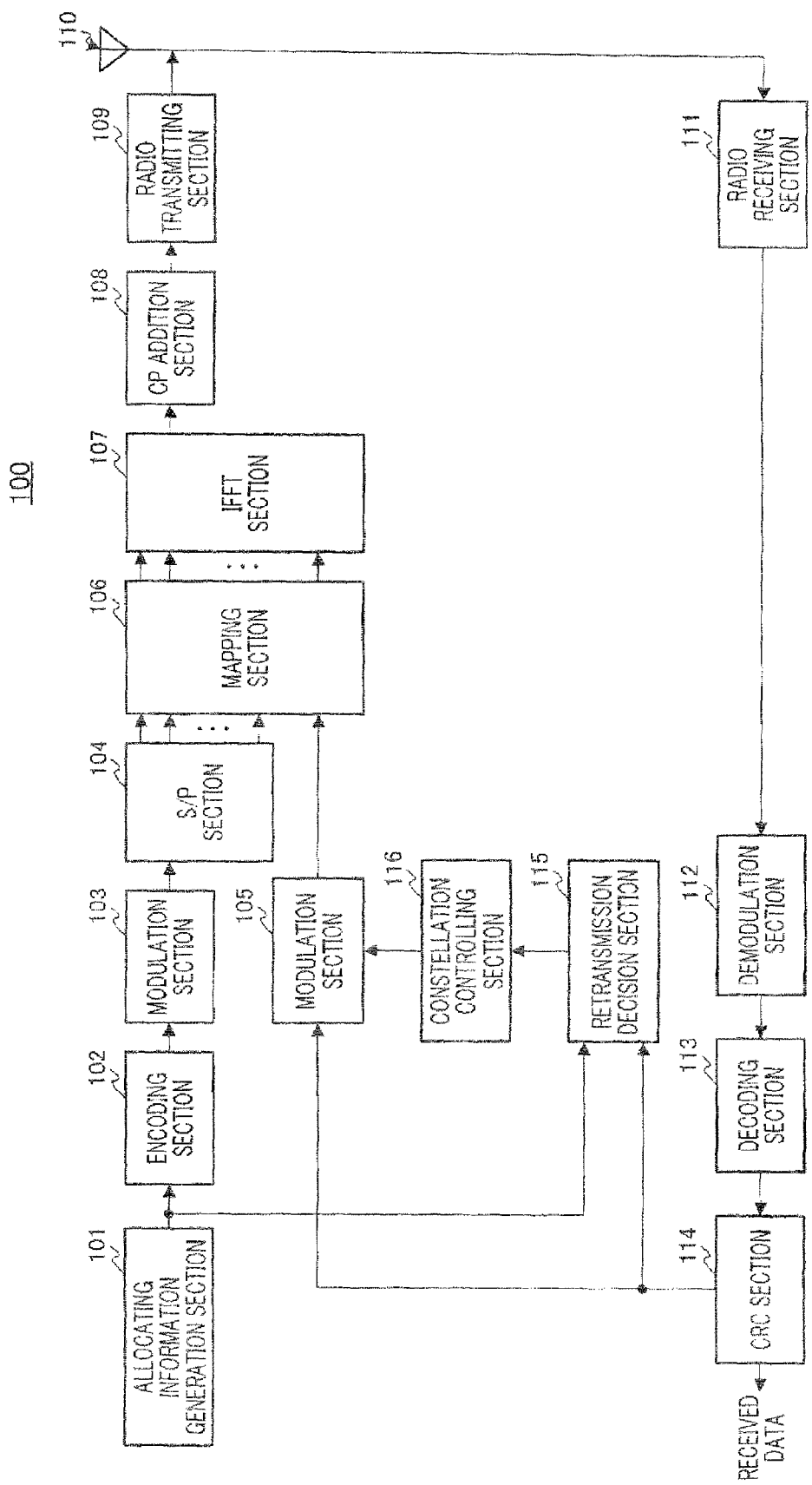
FIG. 2 shows the configuration of the base station according to Embodiment 1.
Figure 3:
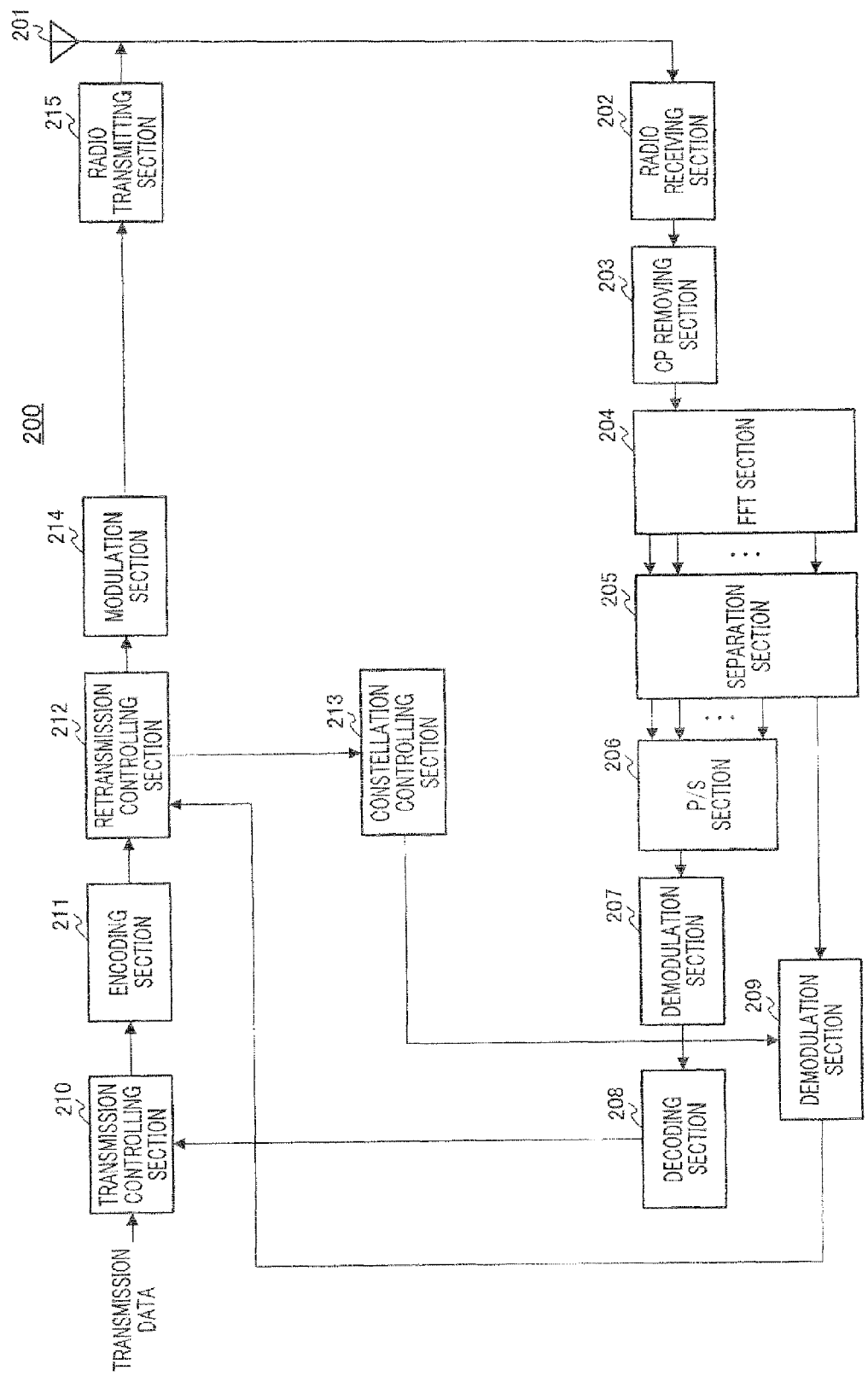
FIG. 3 shows the configuration of the mobile station according to Embodiment 1.

FIG. 2 shows the configuration of base station 100 of the present embodiment, and FIG. 3 shows the configuration of mobile station 200 of the present embodiment.

To avoid complicated explanation, FIG. 2 shows components that pertain to uplink data reception and downlink response signals transmission in response to the uplink data, which the present invention closely related to, and drawings and explanation of the components that pertain to downlink data transmission are omitted. Similarly, FIG. 3 shows components that pertain to uplink data transmission and downlink response signals reception in response to the uplink data, which the present invention closely related to, and drawings and explanation of the components that pertain to downlink data reception are omitted.

In base station 100 in FIG. 2, allocating information generation section 101 generates allocating information showing an uplink data channel is allocated to which mobile station, and outputs the generated allocating information to encoding section 102 and retransmission decision section 115.

Encoding section 102 encodes the allocating information, and outputs the allocating information after encoding to modulation section 103.

Modulation section 103 modulates the allocating information after encoding, to generate a plurality of allocating information symbols, and outputs the allocating information symbols to S/P section 104.

S/P section 104 converts a plurality of serial allocating information symbols received as input from modulation section 103 into parallel allocating information symbols, and outputs the parallel allocating information symbols to mapping section 106.

According to the constellation patterns controlled by constellation controlling section 116, modulation section 105 modulates a response signal (an ACK signal or a NACK signal) in response to uplink data, and outputs the response signal after the modulation processing to mapping section 106. The modulation processing in modulation section 105 will be explained later in detail.

Mapping section 106 maps the allocating information symbols and the response signal to a plurality of subcarriers forming an OFDM symbol, and outputs the mapped information symbols and response signal to IFFT (Inverse Fast Fourier Transform) section 107.

IFFT section 107 performs an IFFT on the allocating information symbols and response signal mapped to a plurality of subcarriers, to generate an OFDM symbol, and outputs the generated OFDM symbol to CP (Cyclic Prefix) addition section 108.

CP addition section 108 adds the same signal as the tail part of the OFDM symbol, as a CP, to the head of the OFDM symbol.

Radio transmitting section 109 performs transmission processing including D/A conversion, amplification and up-conversion on the OFDM symbol with a CP, and transmits the OFDM symbol with a CP after transmission processing from antenna 110 to mobile station 200.

Meanwhile, radio receiving section 111 receives uplink data transmitted from mobile station 200 via antenna 110, and performs receiving processing including down-conversion and A/D conversion for this uplink data.

Demodulation section 112 demodulates the uplink data and, outputs the uplink data after demodulation to decoding section 113.

Decoding section 113 decodes the uplink data after demodulation, and outputs the uplink data after the decoding to CRC section 114.

CRC section 114 performs error detection for the uplink data after the decoding using CRC, and generates, as a response signal, an ACK signal if CRC=OK (no error) or a NACK signal if CRC=NG (error), and outputs the generated response signal to modulation section 105 and retransmission decision section 115. The uplink data is either the initial transmission data or retransmission data, and therefore CRC section 114 generates a response signal to the initial transmission data, and a response signal to retransmission data. Further, if CRC=OK (no error), CRC section 114 outputs the uplink data after decoding as received data.

Figure 1:
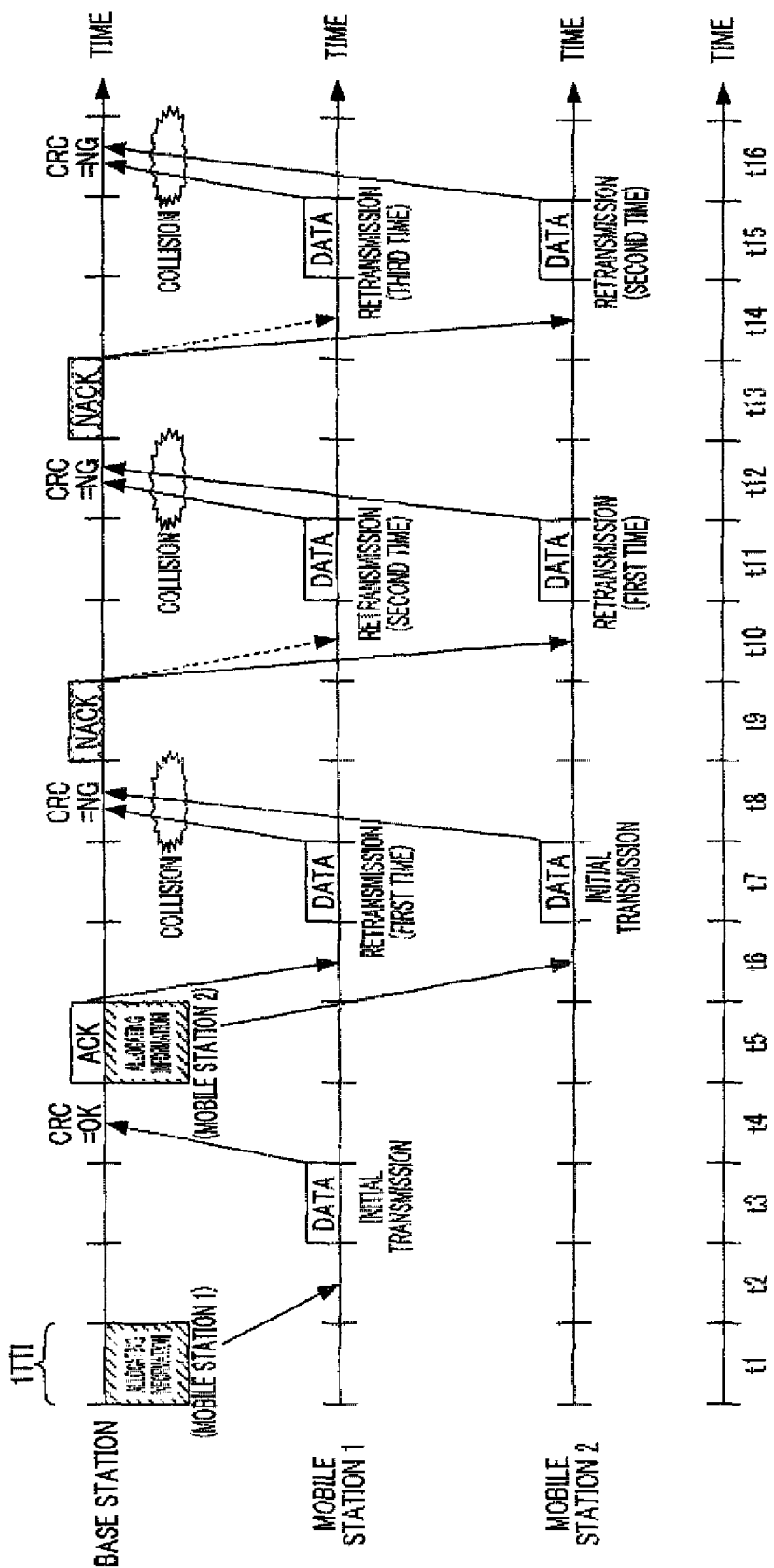
FIG. 1 is an example of an ARQ sequence.

Based on the time difference between the time allocating information as input from allocating information generation section 101 is received and the time a response signal as input from CRC section 114 is received, retransmission decision section 115 decides whether the response signal is a response to the initial transmission data or retransmission data. In the sequence example shown in FIG. 1 above, the time a response signal to the initial transmission data is generated is three TTIs after the time allocating information is generated. Then, for example, retransmission decision section 115 decides that a response signal received as input within four TTIs after the time allocating information is received as input is a response to the initial transmission data, and that a response signal received as input after four TTIs after the time allocating information is received as input is a response to retransmission data. Then, retransmission decision section 115 outputs the decision result to constellation controlling section 116.

According to the decision result in retransmission decision section 115, constellation controlling section 116 controls the constellation patterns used in modulation processing in modulation section 105. The control in constellation controlling section 116 will be described later in detail.

Meanwhile, mobile station 200 shown in FIG. 3, radio receiving section 202 receives an OFDM symbol transmitted from base station 100 via antenna 201, and performs receiving processing including down-conversion and A/D conversion on this OFDM symbol.

CP removing section 203 removes the CP from the OFDM symbol after receiving processing.

FFT (Fast Fourier Transform) section 204 performs an FFT on the OFDM symbol after CP removal, to acquire allocating information symbols and the response signal, and outputs them to separation section 205.

Separation section 205 separates the allocating information symbols and response signal, and outputs the allocating information symbols to P/S section 206 and the response signal to demodulation section 209.

P/S section 206 converts a plurality of parallel allocating information symbols received as input from separation section 205 to serial allocating information symbols, and outputs the serial allocating information symbols to demodulation section 207.

Demodulation section 207 demodulates the allocating information symbols, and outputs the demodulated allocating information after the demodulation to decoding section 208.

Decoding section 208 decodes the allocating information after demodulation, and outputs the allocating information after decoding to transmission controlling section 210.

According to the constellation patterns controlled by constellation controlling section 213, demodulation section 209 demodulates the response signal (ACK signal or NACK signal), and outputs the response signal after the demodulation processing to retransmission controlling section 212. The demodulation processing in demodulation section 209 will be explained later in detail.

When the allocating information received as input from decoding section 208 shows allocation information that uplink data channel is to be allocated to the mobile station, transmission controlling section 210 outputs the transmission data to encoding section 211.

Encoding section 211 encodes the transmission data, and outputs the transmission data after encoding to retransmission controlling section 212.

Upon initial transmission, retransmission controlling section 212 holds the transmission data after encoding and outputs it to modulation section 214. Retransmission controlling section 212 holds transmission data until an ACK signal is received as input from demodulation section 209. Further, when a NACK signal is received as input from demodulation section 209, that is, upon retransmission, retransmission controlling section 212 outputs the held transmission data to modulation section 214. Further, retransmission controlling section 212 outputs the signal showing whether the initial transmission or retransmission is, to constellation controlling section 213.

According to the signal received as input from retransmission controlling section 212, constellation controlling section 213 controls the constellation patterns used in demodulation processing in demodulation section 209. The control in constellation controlling section 213 will be described later in detail.

Modulation section 214 modulates the transmission data after encoding, received as input from retransmission controlling section 212, and outputs it to radio transmission section 215.

Radio transmission section 215 performs transmission processing including D/A conversion, amplification and up-conversion on the transmission data after modulation, and transmits the transmission data after transmission processing from antenna 201 to base station 100. The data transmitted in this way becomes uplink data.

Next, the control in constellation controlling section 116 and the modulation processing in modulation section 105 in base station 100, and the control in constellation controlling section 213 and the demodulation processing in demodulation section 209 in mobile station 200, will be explained in detail.

Figure 4:
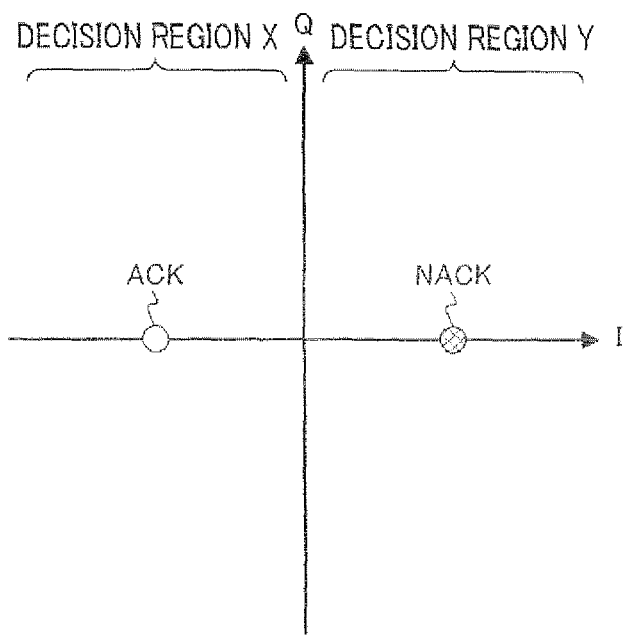
FIG. 4 is constellation pattern A according to Embodiment 1.

Constellation controlling section 116 in base station 100 sets constellation pattern A shown in FIG. 4 in modulation section 105 when a response signal is a response to the initial transmission data. According to this setting, modulation section 105 maps a response signal to the initial transmission data according to constellation pattern A, to modulate the response signal.

Figure 5:
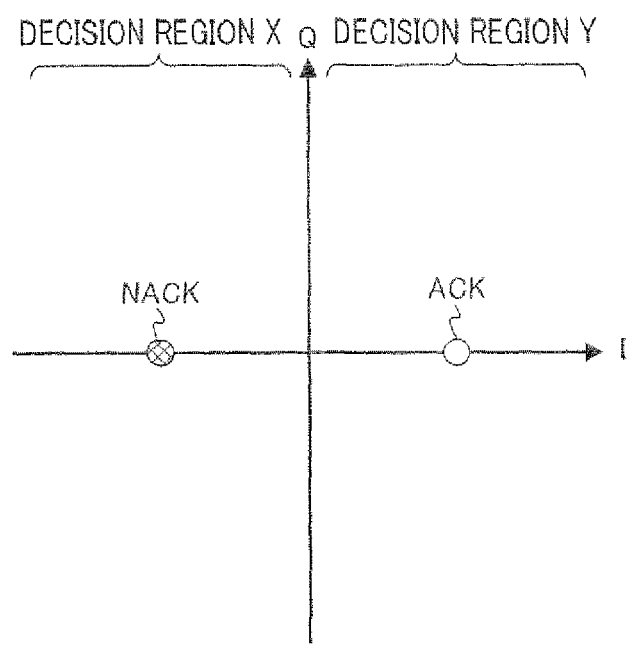
FIG. 5 is constellation pattern B according to Embodiment 1.

On the other hand, controlling section 116 sets constellation pattern B shown in FIG. 5 in modulation section 105 when a response signal is a response to retransmission data. According to this setting, modulation section 105 maps a response signal to retransmission data according to constellation pattern 13, to modulate the response signal.

Here, when constellation pattern A (FIG. 4) and constellation pattern B (FIG. 5) are compared, the mapping position of the ACK signal and mapping position of the NACK signal are inversed with respect to the Q axis. That is, constellation pattern B for a response signal to retransmission data is inversed from constellation pattern A for a response signal to the initial transmission data. That is, modulation section 105 maps a NACK signal for retransmission data to the position where an ACK signal for the initial transmission data is mapped, to modulate the NACK signal. Further, modulation section 105 maps an ACK signal for retransmission data to the position where a NACK signal for the initial transmission data is mapped, to modulate the ACK signal. That is, modulation section 105 inverses the mapping position of an ACK signal in response to the initial transmission data and the mapping position of an ACK signal in response to retransmission data, and inverses the mapping position of a NACK signal in response to the initial transmission data and the mapping position of a NACK signal in response to retransmission data.

Similarly, upon initial transmission, constellation controlling section 213 in mobile station 200 sets constellation pattern A (FIG. 4) in demodulation section 209. Consequently, when radio receiving section 202 receives a response signal to the initial transmission data, demodulation section 209 demodulates the response signal according to constellation pattern A.

On the other hand, upon retransmission, constellation controlling section 213 sets constellation pattern B (FIG. 5) in demodulation section 209. Consequently, when radio receiving section 202 receives a response signal to retransmission data, demodulation section 209 demodulates the response signal according to constellation pattern B.

In this way, in base station 100, modulation section 105 maps a NACK signal in response to retransmission data to the same decision region X (FIG. 5) in constellations as decision region X (FIG. 4) for an ACK signal in response to the initial transmission data, and, meanwhile, maps an ACK signal in response to retransmission data to a different decision region Y (FIG. 5) from decision region X (FIG. 4) for an ACK signal in response to the initial transmission data. Further, in base station 100, modulation section 105 maps an ACK signal in response to retransmission data to the same decision region Y (FIG. 5) in the constellation, as decision region Y (FIG. 4) for a NACK signal in response to the initial transmission data, and, meanwhile, maps a NACK signal in response to retransmission data to a different decision region X (FIG. 5) from decision region Y (FIG. 4) for a NACK signal in response to the initial transmission data. That is, base station 100 switches the decision regions in the constellation between a response signal to the initial transmission data and a response signal, which is a response to retransmission data and representing the same content as a response signal to the initial transmission data, and maps response signals. In this way, with the present embodiment, the decision region for a NACK signal in response to retransmission data is equal to the decision region of an ACK signal in response to the initial transmission data, and the decision region for an ACK signal in response to retransmission data is equal to the decision region of a NACK signal in response to the initial transmission data.

Then, in accordance with the mapping in modulation section 105 in base station 100, by inversing the constellation pattern for a response signal to the initial transmission data and the constellation pattern for a response signal to retransmission data, demodulation section 209 in mobile station 200 switches the decision regions in constellation between the response signal to the initial transmission data and the response signal to retransmission data, to demodulate the response signals.

Hereinafter, FIG. 6 specifically shows a sequence diagram according to the present embodiment. In the following explanation, similar to FIG. 1, after receiving uplink data, the base station feeds back a response signal to the mobile station after the elapse of one TTI. After receiving a NACK signal, the mobile station retransmits uplink data to the base station after the elapse of one TTI. Further, the base station shown in FIG. 6 adopts the configuration shown in FIG. 2 above, and mobile station 1 and mobile station 2 shown in FIG. 6 both adopt the configuration shown in FIG. 3 above.

First, at time t1, the base station transmits allocating information showing uplink data channel is to be allocated to mobile station 1.

Mobile station 1 having received this allocating information transmits uplink data for the first time at time t3.

The base station having received the uplink data from mobile station 1 performs a CRC on this uplink data. If CRC=OK (no error), the base station feeds back an ACK signal at time t5 and transmits allocating information, which shows the uplink data channel is to be allocated to mobile station 2. At this time, the base station transmits an ACK signal within four TTIs from time t1, which is the time the latest allocating information is transmitted, and therefore, modulates this ACK signal according to constellation pattern A (FIG. 4), as this ACK signal is a response to the initial transmission data.

Mobile station 1 transmitted uplink data for the first time at time t3, and therefore determines that the ACK signal fed back from the base station at time t5 is for mobile station 1 and receives the ACK signal Further, mobile station 1 transmitted the uplink data for the first time at time t 3, and therefore demodulates this ACK signal according to constellation pattern A (FIG. 4), as this ACK signal is a response to the initial transmission data. However, due to the influence of poor downlink channel quality at this time for example, mobile station 1 demodulates the feedback ACK signal as a NACK signal by mistake. Consequently, mobile station 1 retransmits uplink data at time t7 (for the first time).

Meanwhile, mobile station 2 having received allocating information transmits uplink data for the first time at time t7.

Therefore, a collision occurs between retransmission data from mobile station 1 and the initial transmission data from mobile station 2, and, as a result, the CRC result in the base station is more likely to be NG (error). Consequently, the base station feeds back a NACK signal at time t9. At this time, the base station transmits a NACK signal within four TTIs from time t5, which is the time the latest allocating information is transmitted, and therefore, modulates this NACK signal, as this NACK signal is a response to the initial transmission data, according to constellation pattern A (FIG. 4).

Mobile station 1 retransmitted uplink data at time t7, and therefore determines that the NACK signal fed back from the base station at time t9 is the NACK signal for mobile station 1 and receives the NACK signal. Further, mobile station 1 retransmitted the uplink data at time t7, and therefore demodulates this NACK signal according to constellation pattern B (FIG. 5), as a response to retransmission data.

Meanwhile, mobile station 2 transmitted uplink data for the first time at time t7, and therefore determines that the NACK signal fed back from the base station at time t9 is for mobile station 2 and receives the NACK signal. Further, mobile station 2 transmitted the uplink data for the first time at time t7, and therefore demodulates this NACK signal according to constellation pattern A (FIG. 4).

That is, the NACK signal modulated according to constellation pattern A in the base station at time t9, is demodulated according to constellation pattern B in mobile station 1 and according to constellation pattern A in mobile station 2. Consequently, the NACK signal fed back from the base station at time t9 is determined as an ACK signal in mobile station 1 and determined as a NACK signal in mobile station 2. In this way, by switching the decision region for a response signal to the initial transmission data and the decision region for response signal to retransmission data in the constellation, and by modulating and demodulating the response signals, it is possible to make response signals of the same content to be identified to represent different content per mobile station.

Mobile station 1 identifies the NACK signal fed back from the base station at time t9 as an ACK signal, and therefore stops transmitting uplink data until mobile station 1 receives allocating information for mobile station 1 the next time. Consequently, mobile station 1 is able to stop incorrect retransmission.

Mobile station 2 identifies the NACK signal fed back from the base station at time t9 as a NACK signal, and therefore retransmits uplink data at time t11 (for the first time).

The base station having received the uplink data from mobile station 2 performs a CRC on this uplink data. If CRC=OK (no error), the base station feeds back an ACK signal at time t13. At this time, the base station transmits an ACK signal within four TTIs from time t5, which is the time the latest allocating information is transmitted, and therefore, modulates this ACK signal, as this ACK signal is a response to retransmission data, according to constellation pattern B (FIG. 5).

Mobile station 2 retransmitted uplink data at time t11, and therefore determines that the ACK signal fed back from the base station at time t13 is for mobile station 2 and receives the ACK signal. Further, mobile station 2 retransmitted the uplink data at time t11, and therefore demodulates this ACK signal according to constellation pattern B (FIG. 5), as a response to retransmission data. Consequently, mobile station 2 identifies the ACK signal fed back from the base station at time t13 as an ACK signal, and therefore stops transmitting uplink data until mobile station 2 receives allocating information for mobile station 2 next time.

In this way, according to the present embodiment, in ARQ in which a plurality of mobile stations share and use one channel for response signals, even when the mobile station receives an ACK signal as a NACK signal by mistake, it is possible to prevent failure of ARQ control.

Figure 7:
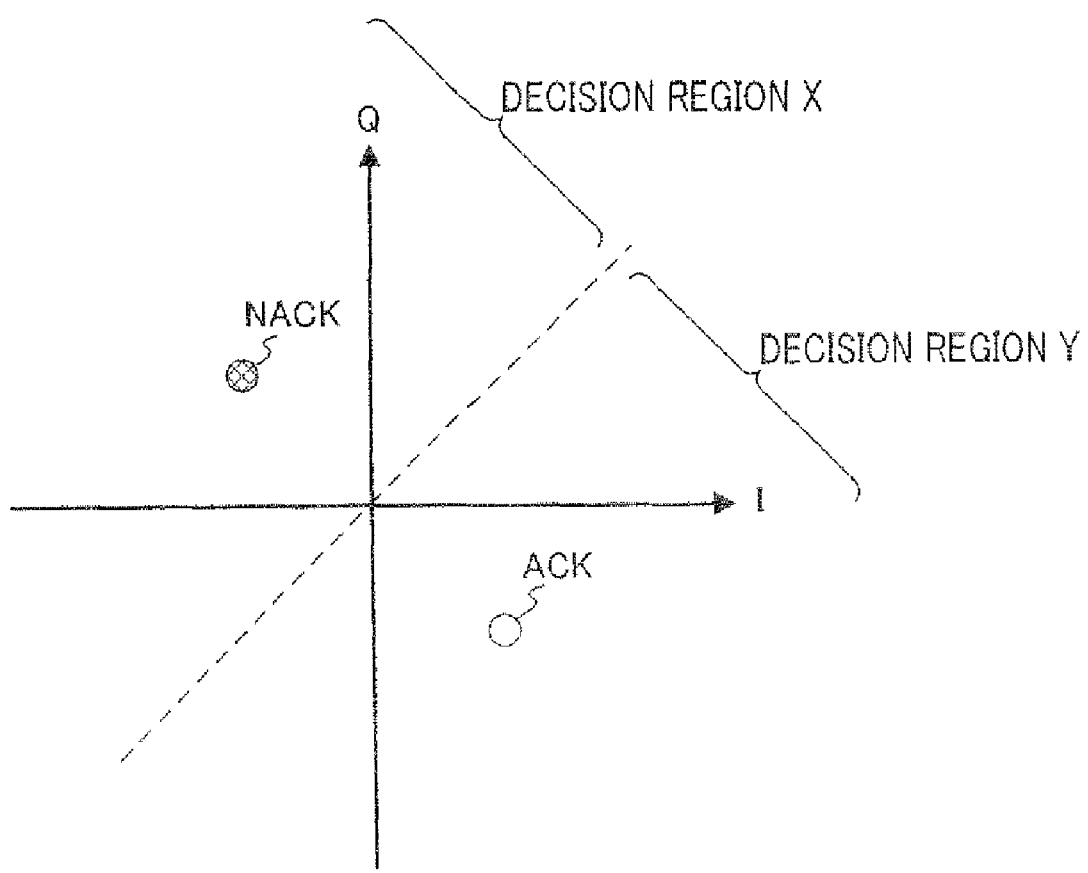
FIG. 7 is an example of a constellation pattern according to Embodiment 1.

Further, although a case has been explained with the above explanation where, to make constellation patterns more simple, the constellation pattern for a response signal to the initial transmission data is inversed and made the constellation pattern for a response signal to retransmission data (FIGS. 4 and 5), for example, the constellation pattern for a response signal to retransmission data may be as shown in FIG. 7. That is, as long as the decision region for a NACK signal in response to the initial transmission data is included in the decision region for an ACK signal in response to retransmission data, any constellation patterns may be used.

Figure 8:
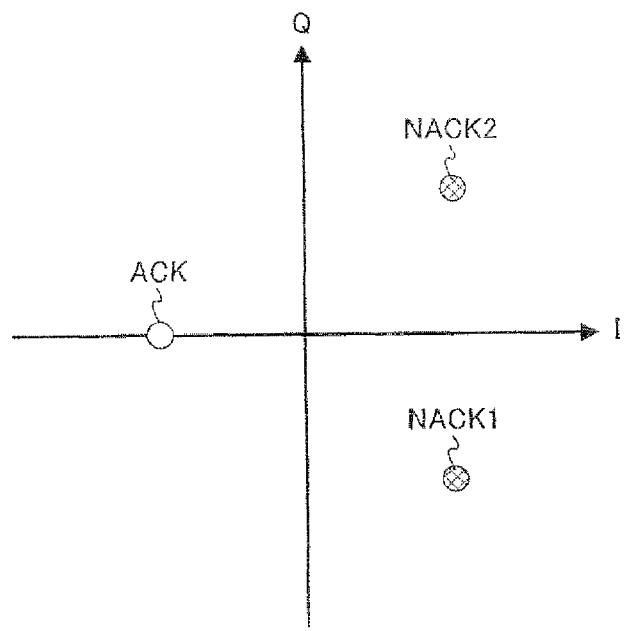
FIG. 8 is an example of the constellation pattern according to Embodiment 1.
Figure 9:
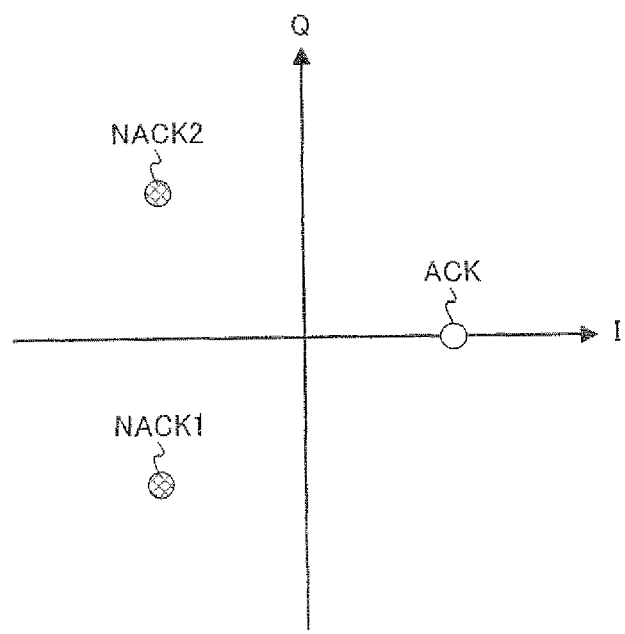
FIG. 9 is an example of the constellation pattern according to Embodiment 1.

Further, in the case where it is necessary to handle a plurality of NACK signals, the constellation pattern for a response signal to the initial transmission data may be as shown in FIG. 8, and the constellation pattern for a response signal to retransmission data may be as shown in FIG. 9.

Figure 10:
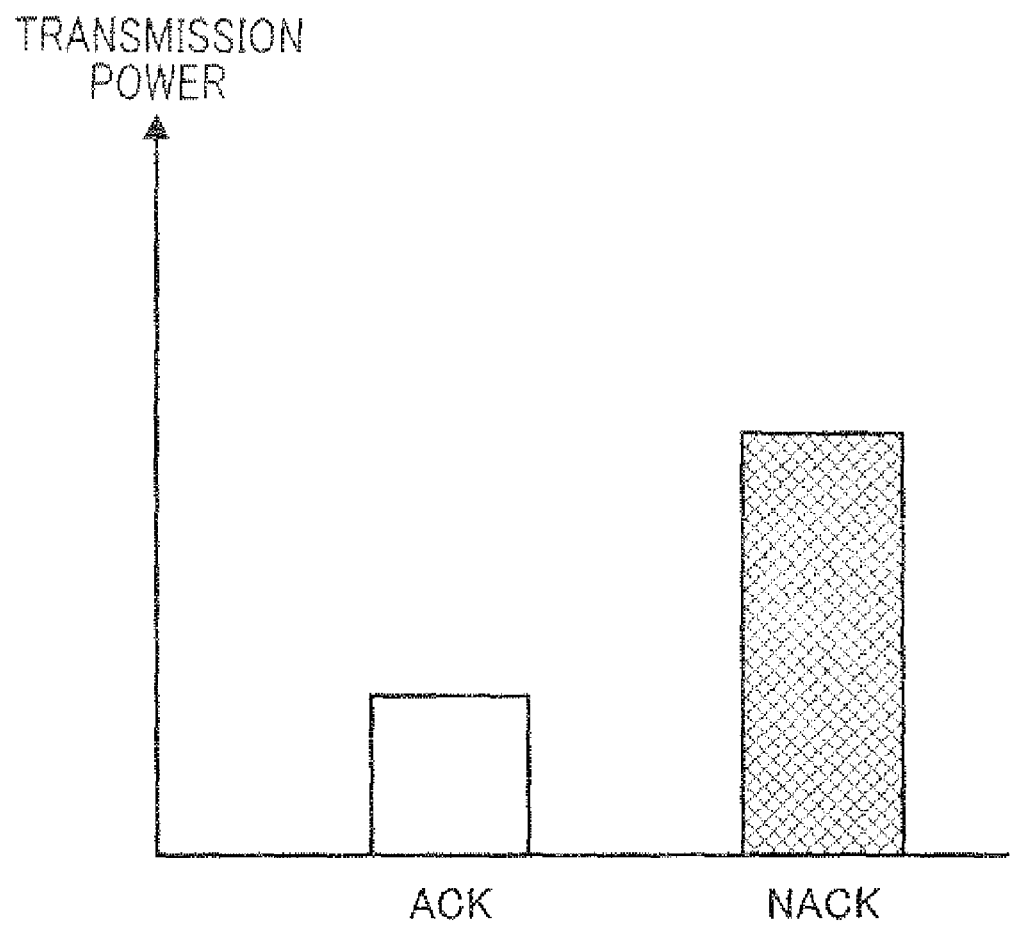
FIG. 10 is an example of transmission power control according to Embodiment 1.

Further, with this embodiment, even when mobile station 1 is located at cell edge, to allow mobile station 1 to receive a NACK signal transmitted in constellation pattern A and identify as an ACK signal, the transmission power of the response signal in constellation pattern A is as shown in FIG. 10, and therefore, it is preferable to increase the transmission power of a NACK signal in response to the initial transmission data.

Further, in base station 100 (FIG. 2), a combination section that combines uplink data may be provided between demodulation section 112 and decoding section 113. According to decision results in retransmission decision section 115, when the initial transmission data is received as input from demodulation section 112, this combination section directly outputs the initial transmission data to decoding section 113, and, when retransmission data is received as input from demodulation section 112, the combination section combines the retransmission data with the initial transmission data or with data combined until then, and outputs the data after the combining as retransmission data to decoding section 113.

Further, this combination section receives allocating information as input from allocating information generation section 101, and decides whether the uplink data is the initial transmission data or retransmission data, similar to retransmission decision section 115, based on the time difference between the time allocating information is received as input and the time uplink data is received as input from demodulation section 112.

Further, retransmission controlling section 212 in mobile station 200 (FIG. 3) may be provided between modulation section 214 and radio transmission section 215.

Embodiment 2

With this embodiment, different constellation patterns are assigned between mobile stations. For example, as mobile station-specific constellation patterns, constellation pattern A (FIG. 4) is assigned to mobile station 1 and constellation pattern B (FIG. 6) is assigned to mobile station 2.

Figure 11:
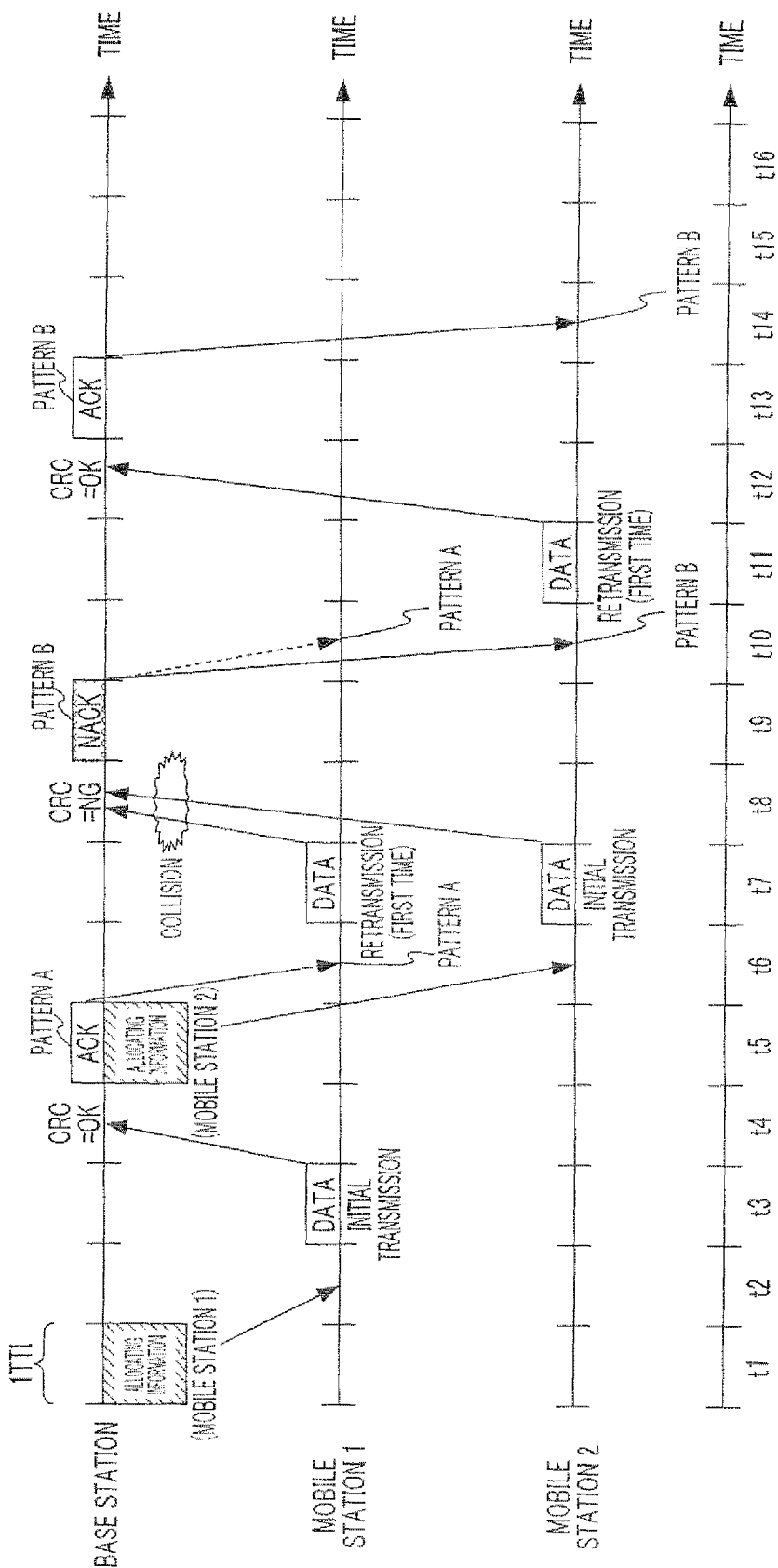
FIG. 11 is an example of the ARQ sequence according to Embodiment 2.

Hereinafter, FIG. 11 specifically shows a sequence diagram according to the present embodiment. In the following explanation, similar to FIG. 1, after receiving uplink data, the base station feeds back a response signal to the mobile station after the elapse of one TTI. After receiving a NACK signal, the mobile station retransmits uplink data to the base station after the elapse of one TTI.

First, at time t1, the base station transmits allocating information showing uplink data channel and constellation pattern A (FIG. 4) are to be assigned to mobile station 1.

Mobile station 1 having received this allocating information transmits uplink data at time t3 for the first time.

The base station having received the uplink data from mobile station 1 performs a CRC on this uplink data. If CRC=OK (no error), the base station feeds back an ACK signal at time t5 and transmits the allocating information, which shows the uplink data channel and constellation pattern B (FIG. 5) are to be assigned to mobile station 2. Further, this ACK signal is for mobile station 1, and therefore, the base station modulates this ACK signal according to constellation pattern A (FIG. 4).

Mobile station 1 transmitted uplink data for the first time at time t3, and therefore determines the ACK signal fed back from the base station at time t5 is for mobile station 1 and receives the ACK signal. Further, mobile station 1 is assigned to constellation pattern A, and therefore, demodulates this ACK signal according to constellation pattern A (FIG. 4). However, due to the influence of poor downlink channel quality at this time for example, mobile station 1 demodulates the feedback ACK signal as a NACK signal by mistake. Consequently, mobile station 1 retransmits uplink data at time t7 (for the first time).

Meanwhile, mobile station 2 having received allocating information transmits uplink data for the first time at time t7.

Therefore, a collision occurs between retransmission data from mobile station 1 and the initial transmission data from mobile station 2, and, as a result, the CRC result in the base station is more likely to be NG (error). Consequently, the base station feeds back a NACK signal at time t9. Further, this NACK signal is for mobile station 2, and therefore, the base station modulates this NACK signal according to constellation pattern B (FIG. 5), Mobile station 1 retransmitted the uplink data at time t7, and therefore determines the NACK signal fed back from the base station at time t9, as the signal for mobile station 1, and receives the NACK signal. Further, mobile station 1 is assigned to constellation pattern A, and therefore demodulates this NACK signal according to constellation pattern A (FIG. 4).

Mobile station 2 transmitted uplink data for the first time at time t7, and therefore determines the NACK signal fed back from the base station at time t9, as the signal for mobile station 2 and receives the NACK signal. Further, mobile station 2 is assigned to constellation pattern B, and therefore demodulates this NACK signal according to constellation pattern B (FIG. 5).

That is, the NACK signal modulated according to constellation pattern B in the base station at time t9 is demodulated according to constellation pattern A in mobile station 1 and according to constellation pattern B in mobile station 2. Consequently, the NACK signal fed back from the base station at time t9 is determined as an ACK signal in mobile station 1 and determined as a NACK signal in mobile station 2. In this way, by assigning unique constellation patterns to the mobile stations, it is possible to make response signals of the same content to be identified to represent different content per mobile station.

Mobile station 1 identifies the NACK signal fed back from the base station at time t9 as an ACK signal, and therefore stops transmitting uplink data until mobile station 1 receives allocating information for mobile station 1 the next time. Consequently, mobile station 1 is able to stop incorrect retransmission.

Mobile station 2 identifies the NACK signal fed back from the base station at time t9 as the NACK signal, and therefore retransmits uplink data at time t11 (for the first time).

The base station having received the uplink data from mobile station 2 performs a CRC on this uplink data. If CRC=OK (no error), the base station feeds back an ACK signal at time t13. Further, this ACK signal is for mobile station 2, and therefore, the base station modulates this ACK signal according to constellation pattern B (FIG. 5).

Mobile station 2 retransmitted the uplink data at time t11, and therefore determines that the ACK signal fed back from the base station at time t13 is for mobile station 2 and receives the ACK signal. Further, mobile station 2 is assigned to constellation pattern B, and therefore demodulates this ACK signal according to constellation pattern B (FIG. 5). Consequently, mobile station 2 identifies the ACK signal fed back from the base station at time t13 as an ACK signal, and therefore stops transmitting uplink data until mobile station 2 receives allocating information for mobile station 2 the next time.

In this way, according to the present embodiment, in ARQ in which a plurality of mobile stations share and use one channel response signals, even when the mobile station receives an ACK signal as a NACK signal by mistake, it is possible to prevent failure of ARQ control.

Figure 13:
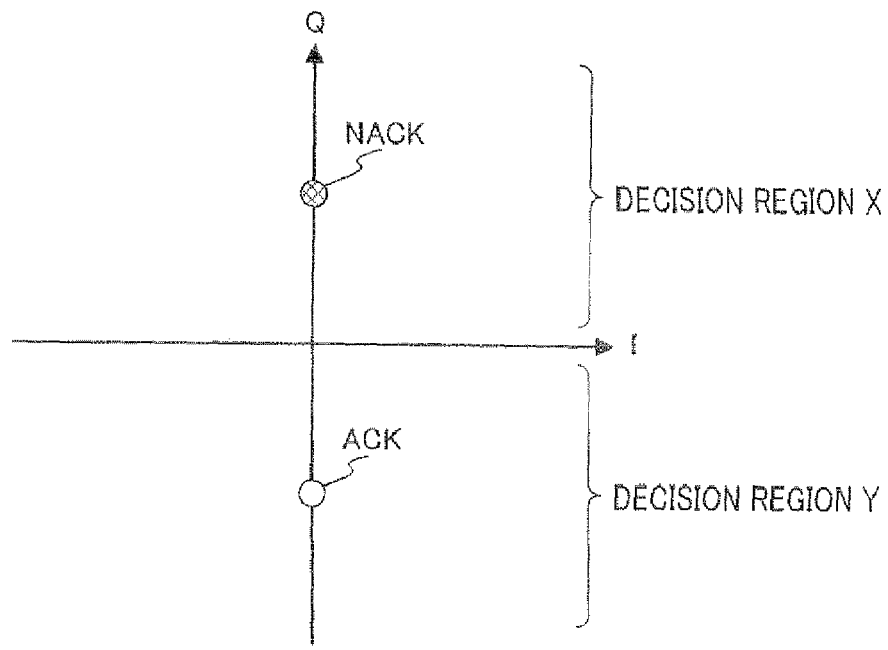
FIG. 13 is constellation pattern C according to Embodiment 2.
Figure 14:
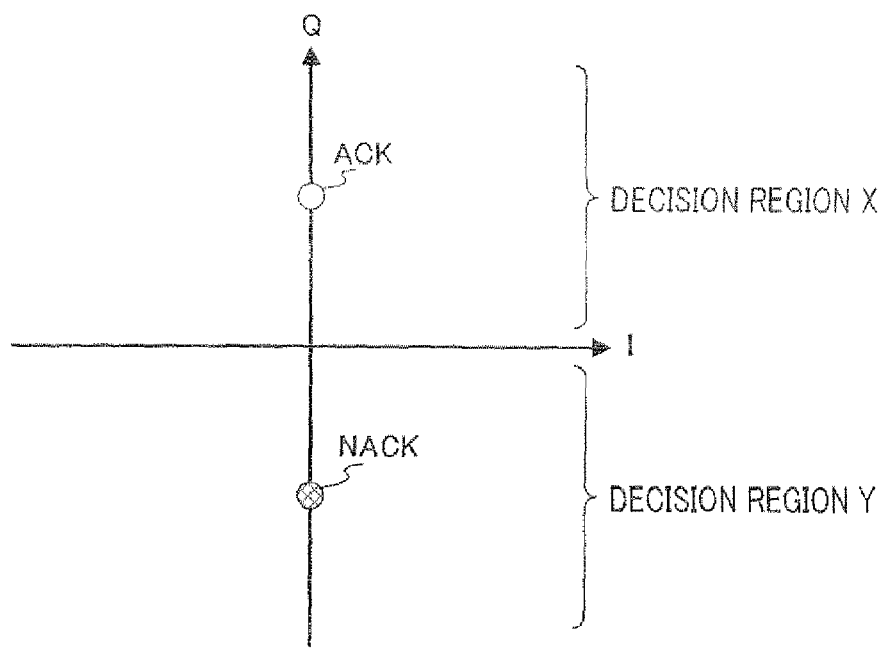
FIG. 14 is constellation pattern D according to Embodiment 2.

In the case where the number of mobile stations increases, for example, where there are mobile stations 3 and 4 in addition to mobile stations 1 and 2, as shown in FIG. 12, constellation pattern C shown in FIG. 13 may be assigned to mobile station 3, and constellation pattern D shown in FIG. 14 may be assigned to mobile station 4.

Further, as shown in FIG. 15, according to the number of times uplink data is transmitted, the constellation patterns for response signals may be changed per mobile station.

Further, in the case of duplicating a response signal (i.e. repetition), respectively different constellation patterns may be assigned to a plurality of the same response signals. This constellation pattern assignment makes it possible to multiply mobile-station specific scrambling codes with a plurality of the same response signals.

Embodiment 3

Figure 16:
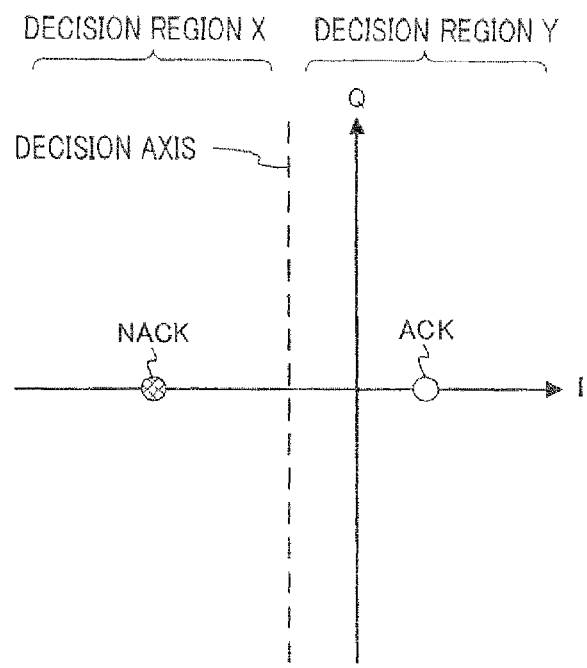
FIG. 16 is constellation pattern B' according to Embodiment 3.

With Embodiment 1, both the decision axis in constellation pattern A (FIG. 4) and the decision axis in constellation pattern B (FIG. 5) are the Q axis. By contrast with this, with the present embodiment, instead of constellation pattern B shown in FIG. 5 above, as shown in FIG. 16, constellation pattern B', in which the constellation pattern shown in FIG. 5 above is shifted in the negative direction along the I axis. That is with the present embodiment, as the constellation pattern for a response signal to retransmission data, a constellation pattern in which the signal point (I, Q)=(0, 0) is included in the decision region for an ACK signal, is used.

Figure 6:
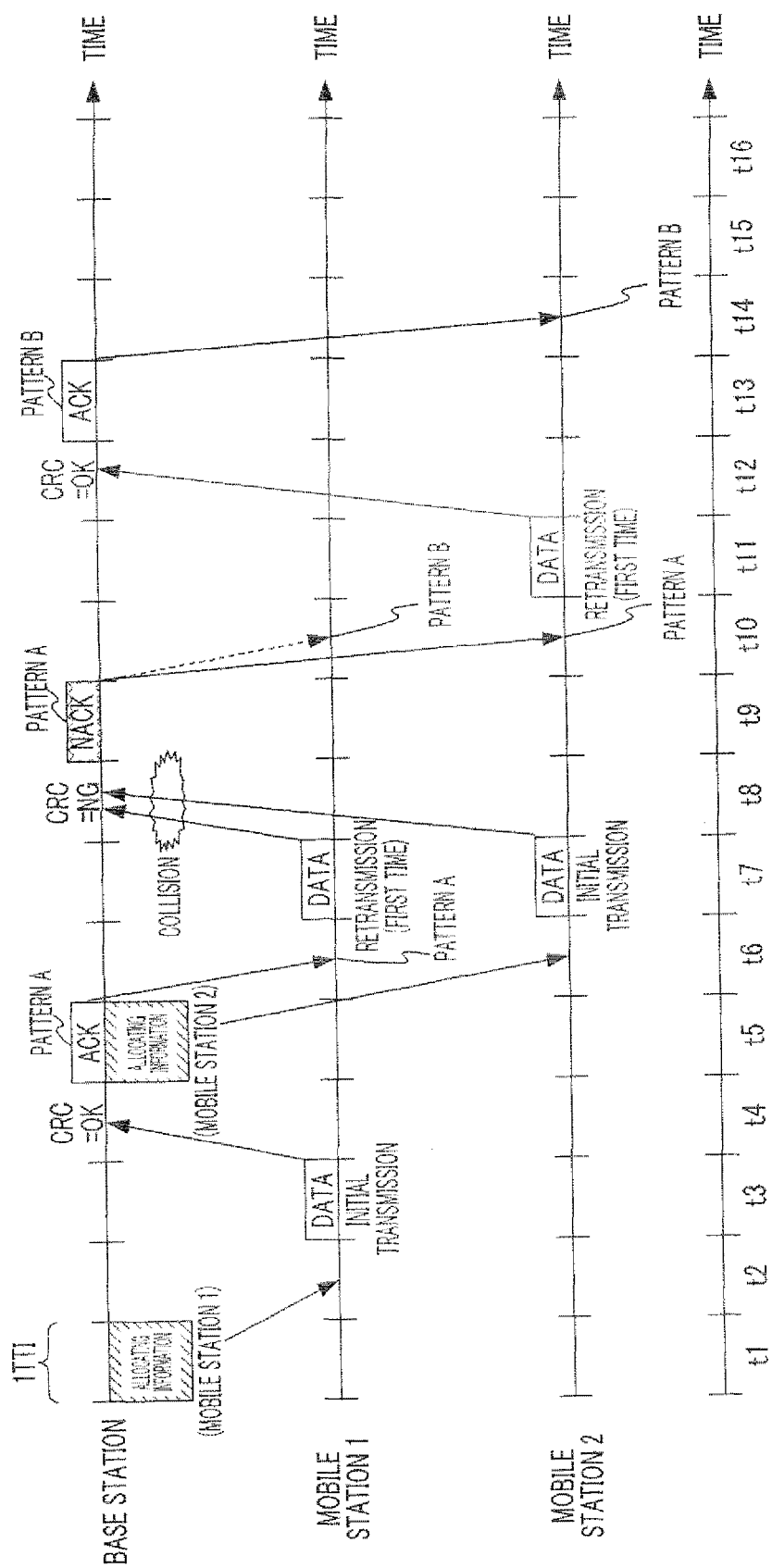
FIG. 6 is an example of the ARQ sequence according to Embodiment 1.

In this way, even when mobile station 1 cannot receive the NACK signal fed back at time t9 in FIG. 6 above, that is, when the signal point of decision target in mobile station 1 at time t10 is (I, Q)=(0, 0), as in Embodiment 1, mobile station 1 can determine the NACK signal fed back at time t9 in FIG. 6 above as an ACK signal.

That is, with the present embodiment, even when the signal point of a decision target is (I, Q)=(0, 0), it is possible to prevent failure of ARQ control, similar to Embodiment 1.

The present embodiment is not only suitable for the case where one channel for response signals is shared and used by a plurality of mobile stations, and is also suitable for the case where a plurality of channels for response signals are present and channels for response signals are different between mobile stations. For example, the present embodiment is also suitable for the case where there are a plurality of resource blocks (RBs) for uplink data and each RB is associated with each channel to transmit a response signal.

For example, RB 1 to RB 4 are present as REs for uplink data, and, in association with RB 1 to RB 4, CH 1 to CH 4 are present as channels for transmitting response signals. Here, if a plurality of RBs in RB 1 to RB 4 are allocated to one mobile station, the channels for transmitting response signals may be different per mobile station. Particularly, when the channel associated with the RB of the smallest number (or the largest number) among a plurality of RBs allocated to one mobile station is made the channel for response signals for that mobile station, mobile stations more often differ channels for transmitting response signals. For example, if RB 1 and RB 2 among RB 1 to RB 4 are allocated to mobile station 1 and RB 3 and RB 4 are allocated to mobile station 2, the base station transmits a response signal to mobile station 1 using CH 1 and transmits a response signal to mobile station 2 using CH 3.

That is, a NACK signal is fed back using CH 3 at time t9 in FIG. 6. The response signal channel for mobile station 1 is CH 1, and therefore, mobile station 1 cannot receive the NACK signal fed back at time t9. That is, the signal point of a decision target in mobile station 1 at time t10 is (I, Q)=(0, 0).

In this way, when a plurality of REs and a plurality of channels for transmitting response signals are associated, the cases occur more often where signal point of a decision target is (I, Q)=(0, 0). That is, the present embodiment is also suitable for the case where each RB is associated with each channel for transmitting a response signal.

Figure 17:
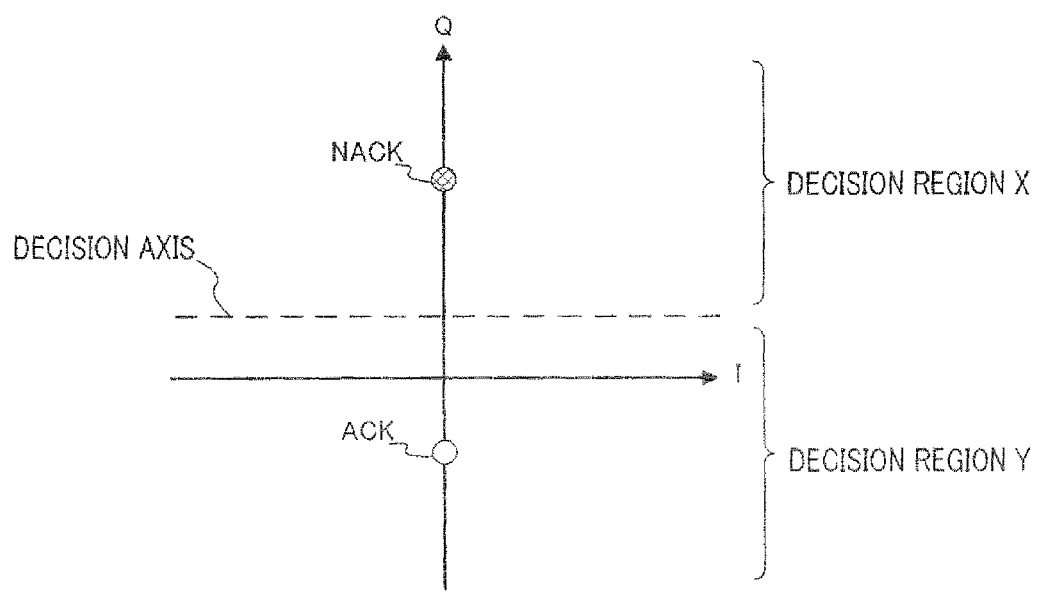
FIG. 17 is constellation pattern B" according to Embodiment 3.

Further, with the present embodiment, instead of constellation pattern B shown in FIG. 5 above, as shown in FIG. 17, after the constellation pattern shown in FIG. 4 is rotated at 90 degrees by phase, constellation pattern B" shifted in the positive direction along the Q axis may be used. In constellation pattern B" in FIG. 17, signal point (I, Q)=(0, 0) is included in the decision region for an ACK signal as in constellation pattern B' shown in FIG. 16.

Embodiment 4

With Embodiment 1, the constellation pattern for a response signal to the initial transmission data and the constellation pattern for a response signal to retransmission data are made different. By contrast with this, with the present embodiment, the scrambling code for a response signal to the initial transmission data and the scrambling code for a response signal to retransmission data are made different.

Figure 18:
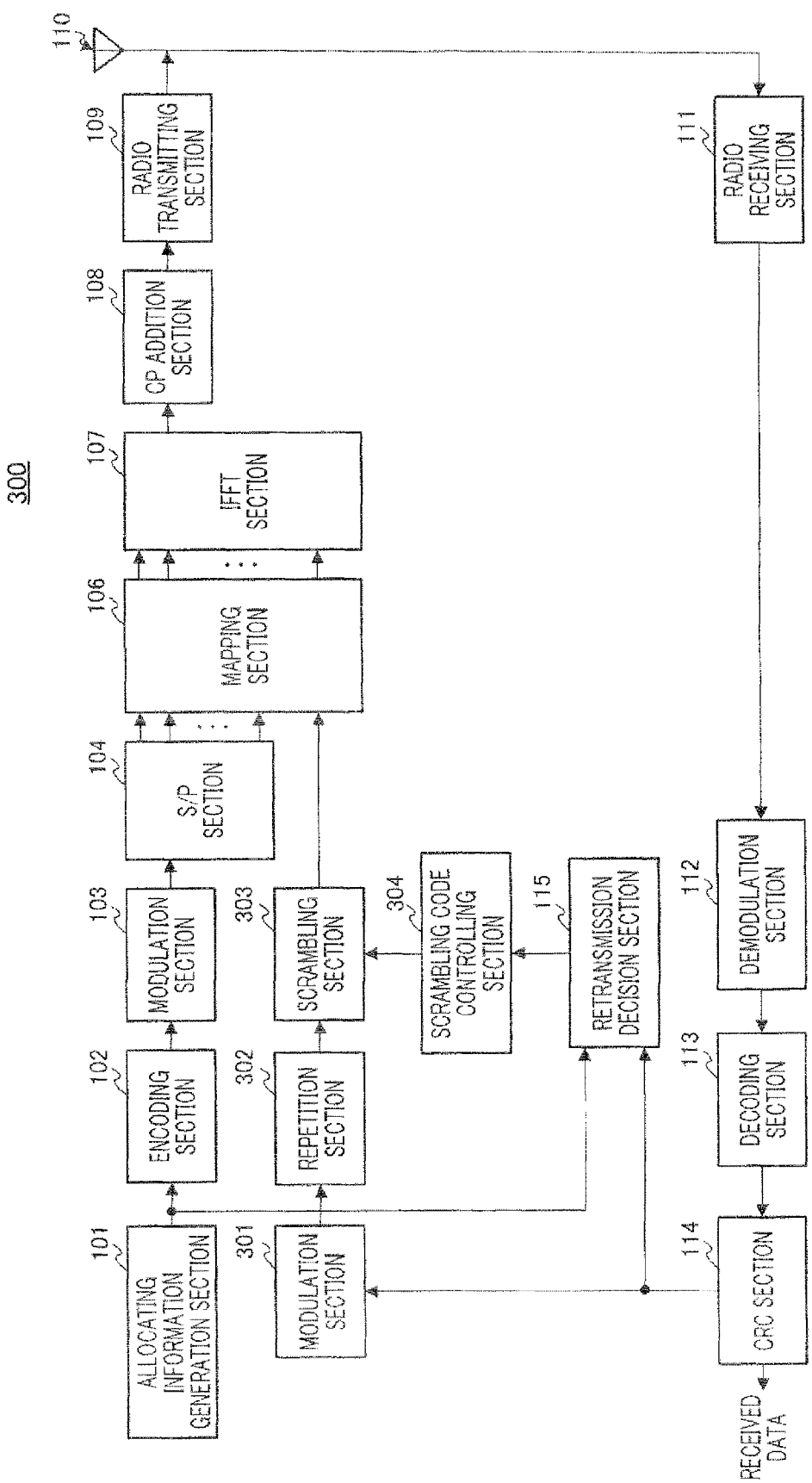
FIG. 18 shows the configuration of the base station according to Embodiment 4.
Figure 19:
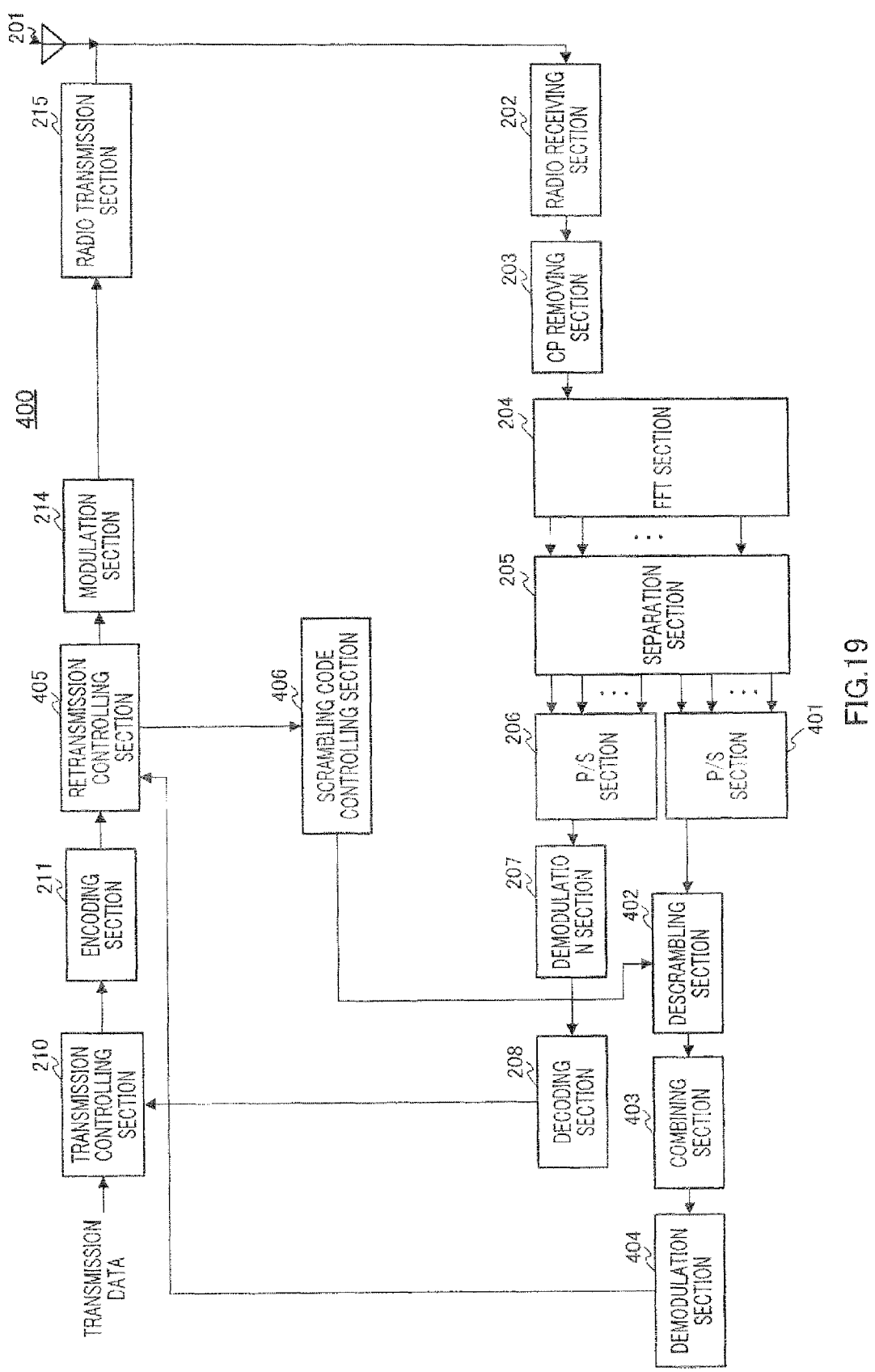
FIG. 19 shows the configuration of the mobile station according to Embodiment 4.

FIG. 18 shows the configuration of base station 300 of the present embodiment, and FIG. 19 shows the configuration of mobile station 400 of the present embodiment. In FIGS. 18 and 19, the same reference numerals will be assigned to the same components in Embodiment 1 (FIGS. 2 and 3) and overlapping descriptions thereof will be omitted.

In base station 300 shown in FIG. 18, modulation section 301 modulates a response signal (an ACK signal or a NACK signal) in response to uplink data, and outputs the response signal after modulation processing to repetition section 302.

Repetition section 302 repeats the response signal received as input from modulation section 301, to acquire a plurality of the same response signals, and outputs a plurality of these response signals to scrambling section 303.

Scrambling section 303 scrambles a plurality of response signals with scrambling codes controlled by scrambling code controlling section 304, and outputs a plurality of response signals after the scrambling to mapping section 106. The scrambling processing will be explained later in detail.

According to the decision result in retransmission decision section 115, scrambling code controlling section 304 controls the scrambling code used in the scrambling processing in scrambling section 303.

Meanwhile, in mobile station 400 shown in FIG. 19, separation section 205 separates the allocation information symbols and the response signals, and outputs the assignment information symbols to P/S section 206 and the response signals to P/S section 401.

P/S section 401 converts a plurality of response signals received as input in parallel from separation section 205 into a plurality of serial response signals, and outputs a plurality of serial response signals to descrambling section 402.

Descrambling section 402 descrambles a plurality of response signals with scrambling codes controlled by scrambling code controlling section 406, and outputs a plurality of response signals after the descrambling to combining section 403. The descrambling processing will be explained later in detail.

Combining section 403 combines a plurality of response signals after the descrambling and outputs the response signal after the combining to demodulation section 404. The combining processing will be explained later in detail.

Demodulation section 404 demodulates the response signal after the combining and determines whether the signal after demodulation processing is an ACK signal, a NACK signal or DTX (Discontinuous Transmission). Then, modulation section 404 outputs the determination result to retransmission controlling section 405.

Upon initial transmission, retransmission controlling section 405 holds the transmission data after encoding and outputs it to modulation section 214. Retransmission controlling section 405 holds transmission data until an ACK signal or DTX is received as input from demodulation section 404, and discards the transmission data when an ACK signal or DTX is received as input. Further, when a NACK signal is received as input from demodulation section 404, that is, upon retransmission, retransmission controlling section 405 outputs the held transmission data to modulation section 214 again. Further, retransmission controlling section 405 outputs the signal showing whether the initial transmission or retransmission to scrambling code controlling section 406.

According to the signal received as input from retransmission controlling section 405, scrambling code controlling section 406 controls the scrambling codes used in descrambling processing in descrambling section 402.

Next, the scrambling processing in base station 300, the descrambling processing in mobile station 400 and the combining processing in mobile station 400, will be explained in detail according to the sequence example shown in FIG. 20.

Here, the scrambling code for the initial transmission is SC #1 (C1, C2)=(1, −1) and the scrambling code for retransmission is SC #2 (C1, C2)=(1, 1). That is, scrambling code controlling section 304 in base station 300 sets SC #1 in scrambling section 303 when the response signal is determined as a response to the initial transmission data, and sets SC #2 in scrambling section 303 when the response signal is determined as a response to retransmission data. Similarly, scrambling code controlling section 406 sets SC #1 in descrambling section 402 when a signal representing the initial transmission is received as input, and sets SC #2 in descrambling section 402 when a signal representing retransmission is received as input.

Both mobile station 1 and mobile station 2 adopt the configuration shown in FIG. 19.

Figure 21:
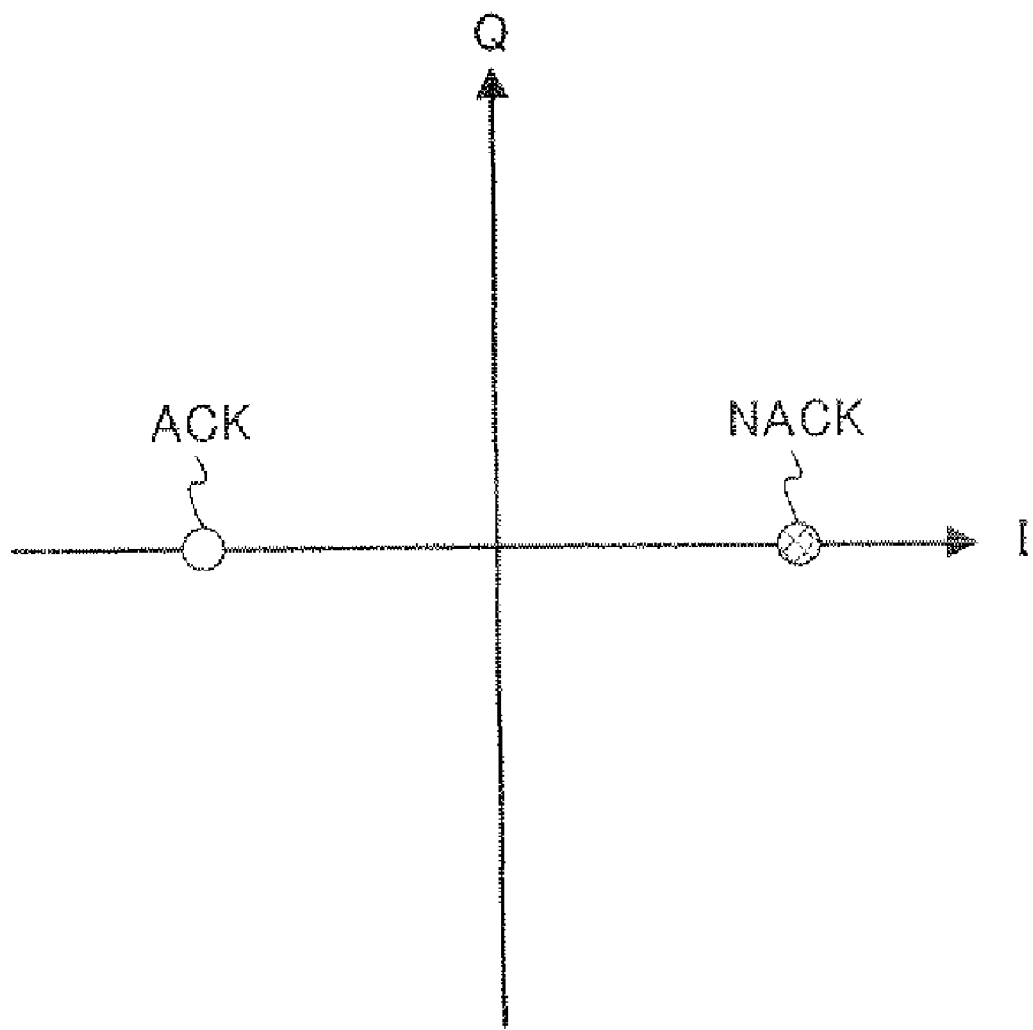
FIG. 21 is a constellation pattern according to Embodiment 4.

Further, FIG. 21 shows the constellation pattern in modulation section 301 in base station 300 (i.e. the constellation pattern for the response signal).

Further, the repetition factor (RF) in repetition section 302 of base station 300 is two, and repetition section 302 performs repetition. That is, two identical response signals are acquired in repetition section 302.

Figure 20:
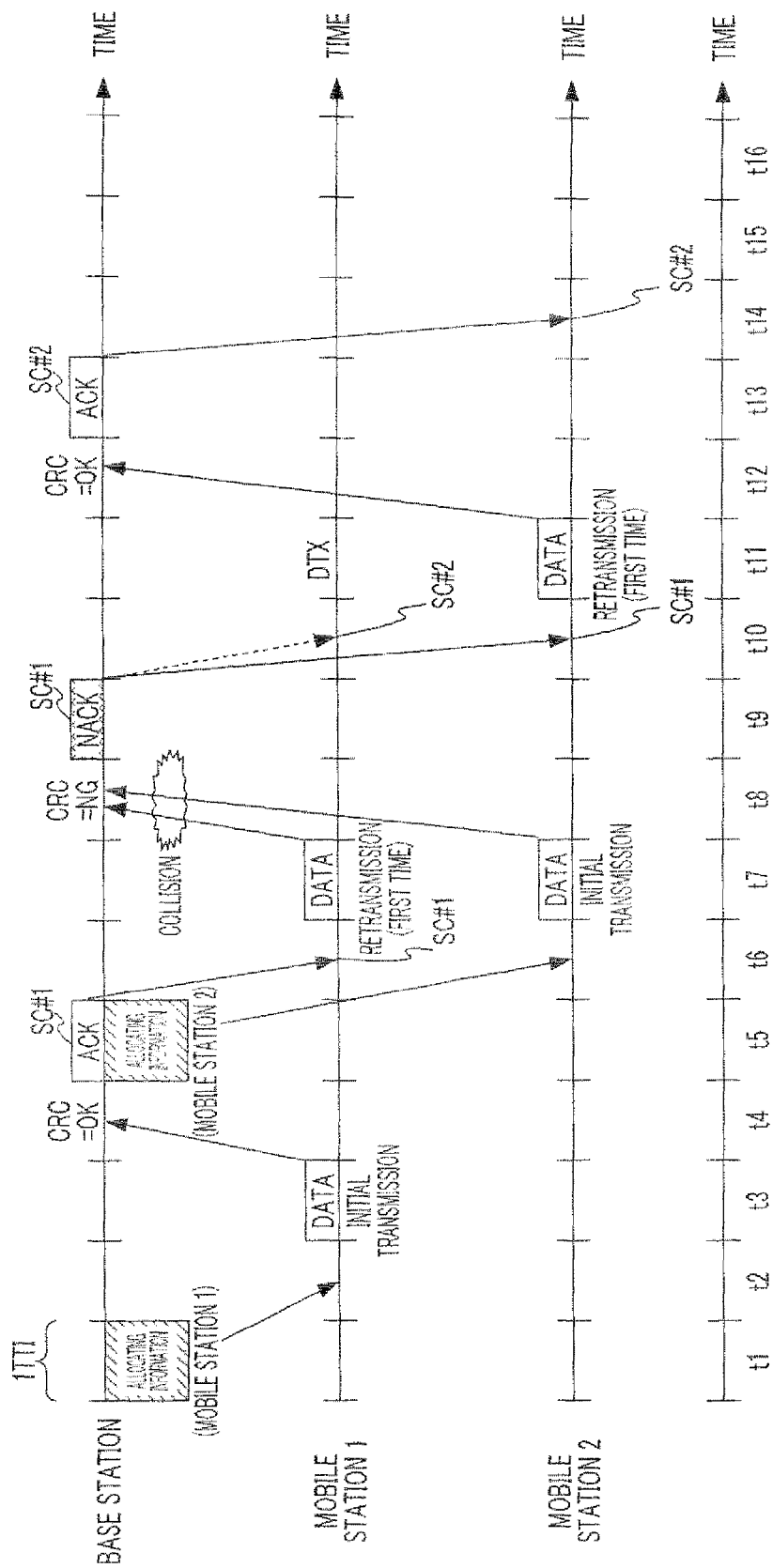
FIG. 20 is an example of an ARQ sequence according to Embodiment 4.

In FIG. 20, base station 300 transmits allocating information showing uplink data channel is to be allocated to mobile station 1.

Mobile station 1 having received this allocating information transmits uplink data for the first time at time t3.

Base station 300 having received the uplink data from mobile station 1 performs a CRC on this uplink data. If CRC=OK (no error), base station 300 feeds back an ACK signal at time t5 and transmits allocating information showing the uplink data channel is to be allocated to mobile station 2. The ACK signal is transmitted within four TTIs from time t1, which is the time the latest allocating information is transmitted, and therefore, scrambling section 303 scrambles with SC #1 (C1, C2) the two ACK signals (S1, S2) received as input from repetition section 302, as response signals to the initial transmission data. That is, scrambling section 303 multiplies the two ACK signals S1 and S2 by 1 and −1, respectively. Consequently, the response signals fed back from base station 300 are S1×1 and S2×−1.

Mobile station 1 transmitted uplink data for the first time at time t3, and therefore determines the two response signals fed back from base station 300 at time t5 are for mobile station 1 and receives the response signals. Further, mobile station 1 transmitted the uplink data for the first time at time t3, and therefore descrambles with SC #1 (C1, C2) these response signals, as these response signals are responses to the initial transmission data. However, due to the influence of poor downlink channel quality at this time for example, mobile station 1 misidentifies ACK signals for NACK signals. That is, mobile station 1 retransmits uplink data at time t7 (for the first time).

Meanwhile, mobile station 2 having received allocating information transmits uplink data for the first time at time t7.

Figure 22:
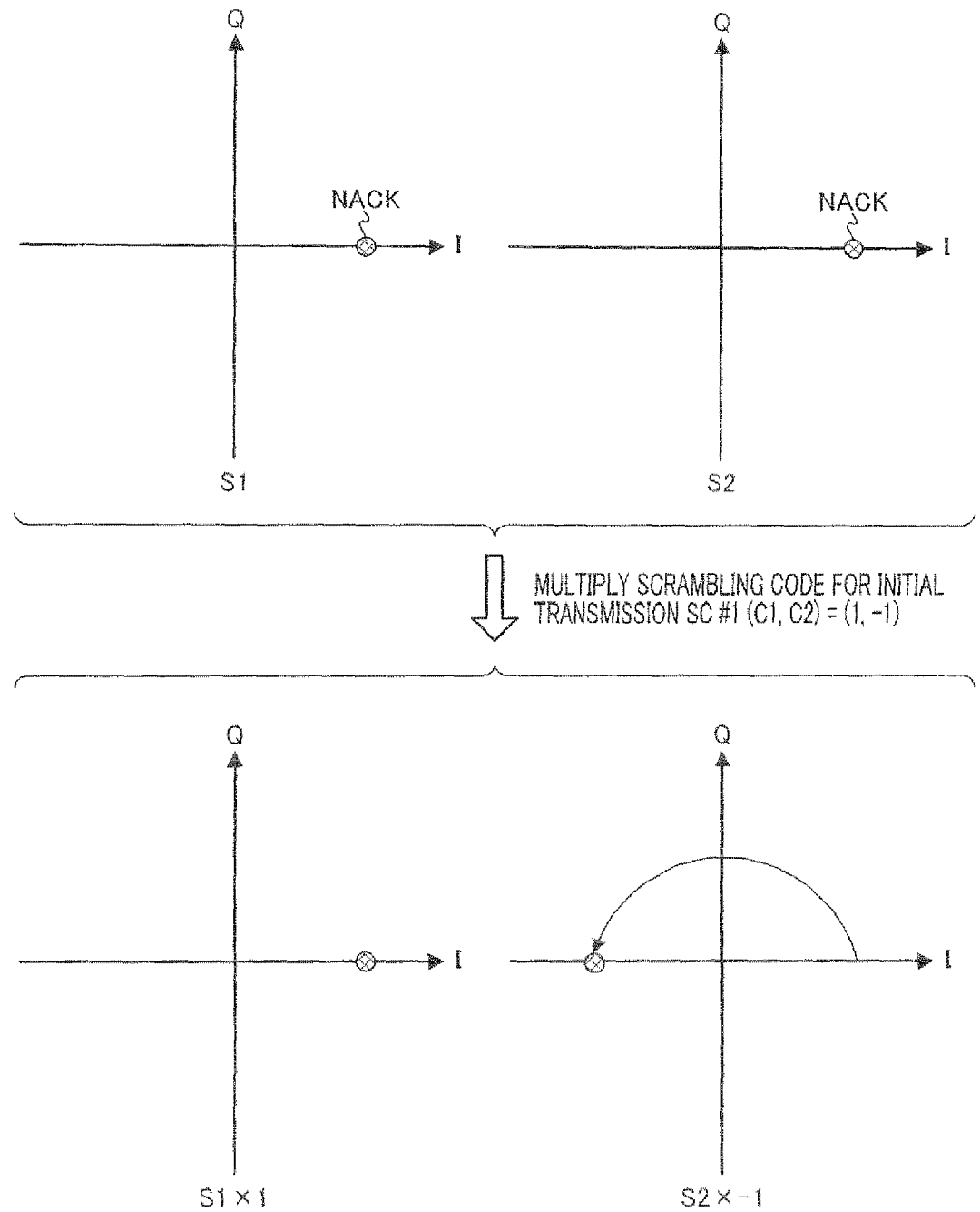
FIG. 22 shows examples of scrambling according to Embodiment 4.

Therefore, a collision occurs between retransmission data from mobile station 1 and the initial transmission data from mobile station 2, and, as a result, the CRC result in base station 300 is more likely to be NG (error). Consequently, base station 300 feeds back a NACK signal at time t9. The NACK signal is transmitted within four TTIs from time t5, which is the time the latest allocating information is transmitted, and therefore, as shown in FIG. 22, scrambling section 303 scrambles with #1 (C1, C2) the two NACK signals (S1 and S2) received as input from repetition section 302, as response signals to the initial transmission data. That is, scrambling section 303 multiplies the two NACK signals S1 and S2 by 1 and −1, respectively. Consequently, the response signals fed back from base station 300 are S1×1 and S2×−1.

Figure 23:
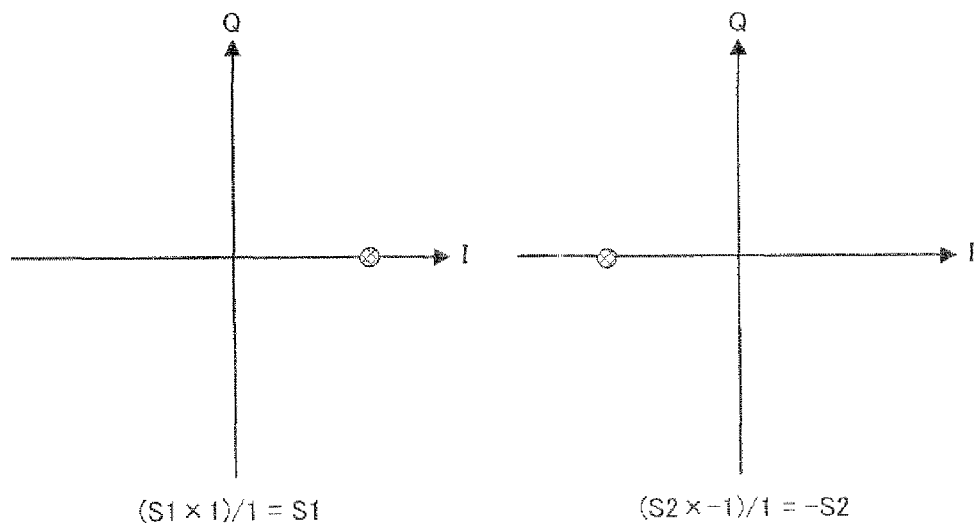
FIG. 23 illustrates examples of descrambling (mobile station 1) according to Embodiment 4.
Figure 23:
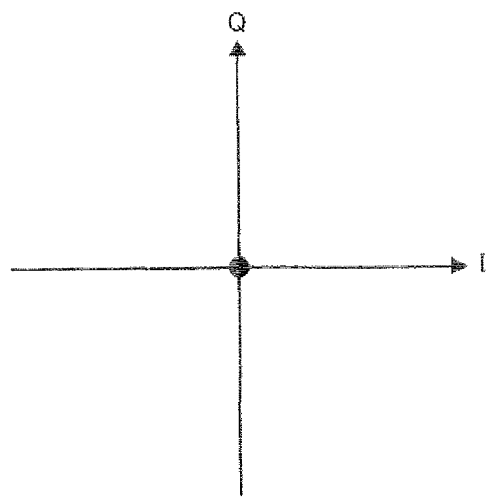

Mobile station 1 retransmitted uplink data at time t7, and therefore determines that the two response signals fed back from base station 300 at time t9 are the response signals for mobile station 1 and receives the response signals. Further, mobile station 1 retransmitted the uplink data at time t7, and therefore descrambles with #2 (C1, C2) these response signals, as these response signals are responses to retransmission data. That is, as shown in FIG. 23, descrambling section 402 in mobile station 1 descrambles two response signals received as input from P/S section 401, that is, descrambles S1×1 and S2×−1 shown in FIG. 22 with the scrambling code for retransmission SC #2. That is, descrambling section 402 in mobile station 1 divides S1×1 and S2×−1 by 1 and 1, respectively. Consequently, descrambling section 402 in mobile station 1 is able to acquire S1 and −S2 in the signal point constellation shown in FIG. 23.

Figure 24:
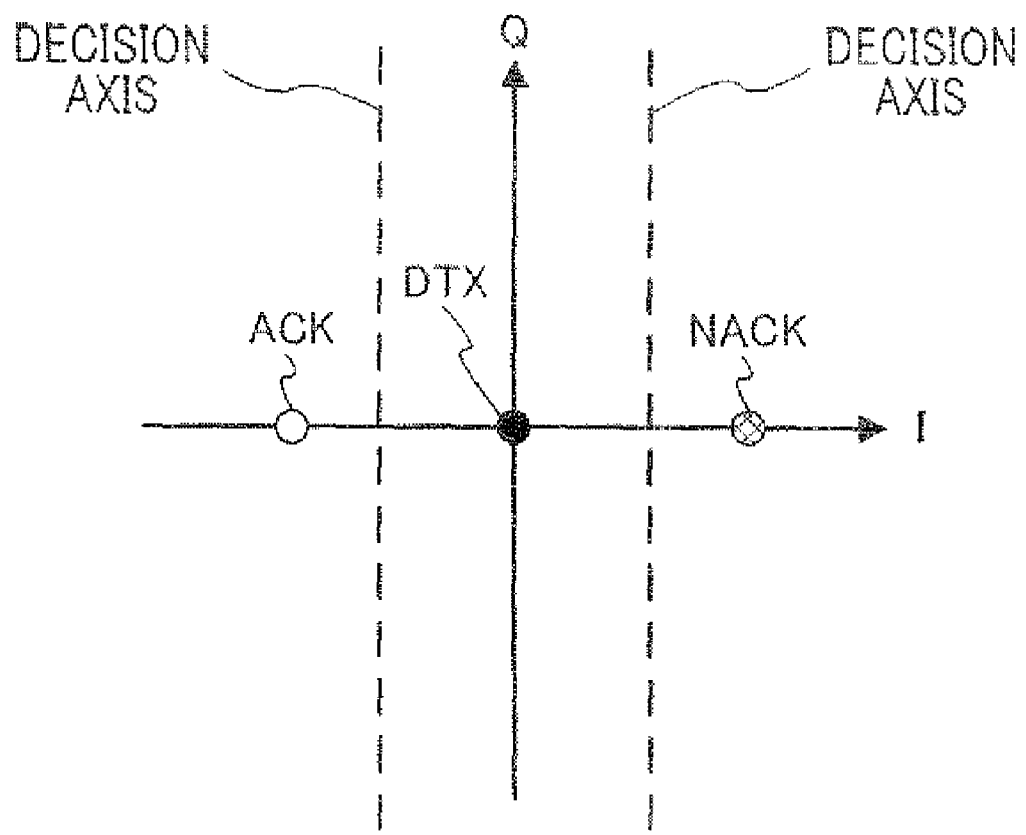
FIG. 24 illustrates a decision example according to Embodiment 4.

Next, combining section 403 in mobile station 1 combines S1 and −S2 received as input from descrambling section 402. That is, the response signal after the combining is allocated to the signal point of (I, Q)=(0, 0) as shown in FIG. 23. Then, demodulation section 404 in mobile station 1 determines this response signal after the combination according to the decision axis shown in FIG. 24. That is, mobile station 1 determines the response signal (NACK signal) from base station 300 for mobile station 2 as DTX. Further, when the response signal is determined as DTX, mobile station 1 determines that mobile station 1 has misidentified an ACK signal for a NACK signal at time t6. That is, mobile station does not retransmit uplink data at time t11. Consequently, mobile station 1 can stop transmitting uplink data by mistake.

Figure 25:
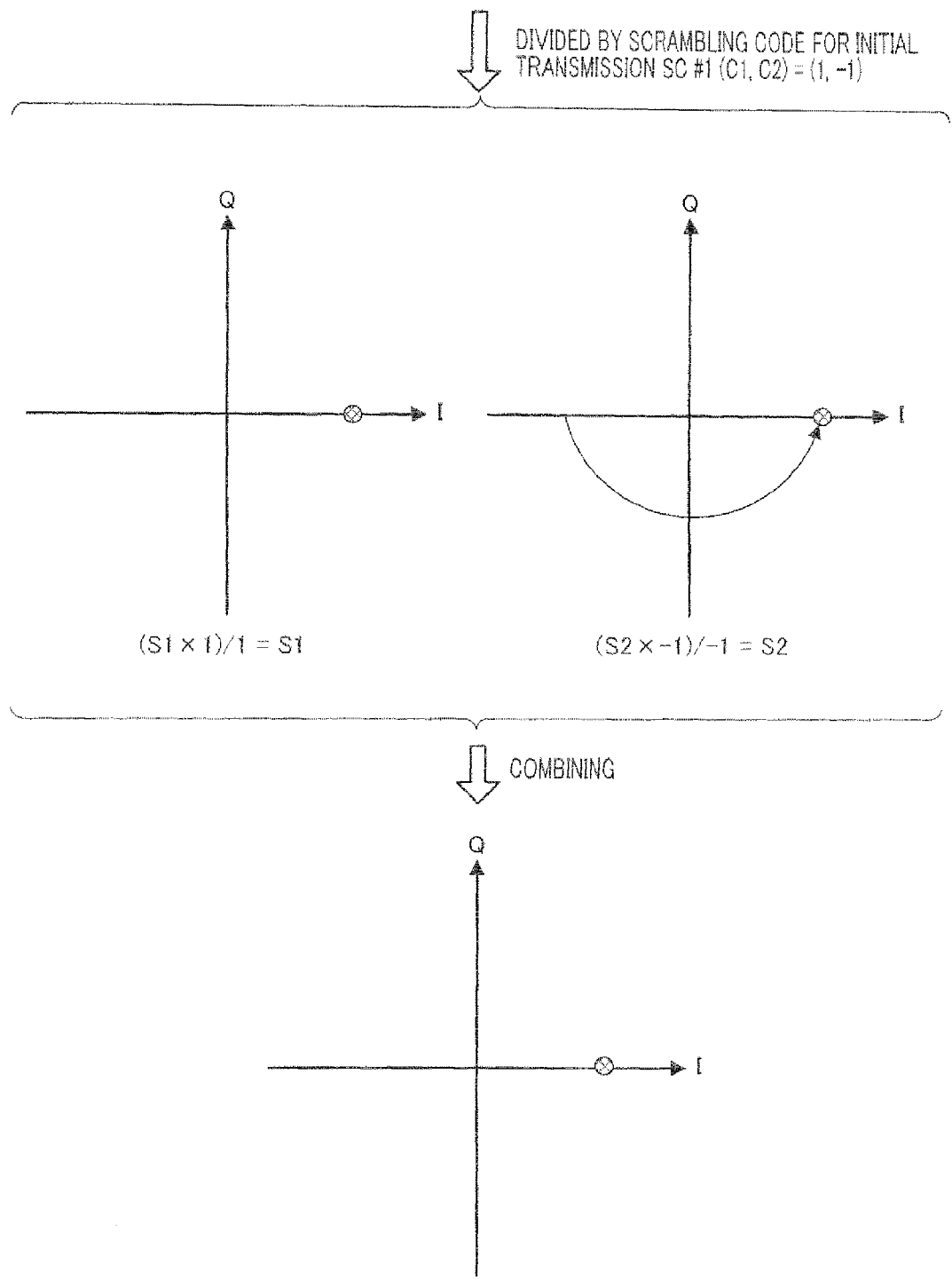
FIG. 25 illustrates examples of descrambling (mobile station 2) according to Embodiment 4.

Meanwhile, mobile station 2 transmitted uplink data for the first time at time t7, and therefore determines that the two response signals fed back from the base station at time t9 are responses to mobile station 2 and receives two response signals. Further, mobile station 2 transmitted the uplink data for the first time at time t7, and therefore descrambles with SC #1 (C1, C2) these response signals, as these response signals are responses to the initial transmission data. That is, as shown in FIG. 25, descrambling section 402 in mobile station 2 descrambles the two response signals received as input from P/S section 401, that is, descrambles S1×1 and S2×−1 shown in FIG. 22 with the scrambling code for initial transmission SC #1. That is, descrambling section 402 in mobile station 2 divides S1×1 and S2×−1 by 1 and −1, respectively. Consequently, descrambling section 402 in mobile station 2 is able to acquire S1 and S2 in the signal point constellation shown in FIG. 25.

Next, combining section 403 in mobile station 2 combines S1 and S2 received as input from descrambling section 402. That is, as shown in FIG. 25, the response signal after the combining is allocated to the signal point (FIG. 21) of the NACK signal in base station 300. Then, demodulation section 404 in mobile station 2 determines this response signal after the combination according to the decision axis shown in FIG. 24, as in demodulation section 404 in mobile station 1. That is, mobile station 2 determines the response signal from base station 300 for mobile station 2 as a NACK signal. That is, mobile station 2 retransmits uplink data at time t11 (for the first time).

Consequently, a collision does not occur between uplink data from mobile station 1 and uplink data from mobile station 2 at time t12, and CRC=OK (no error) in base station 300.

If CRC=OK (no error), base station 300 feeds back ACK signal at time t13. The ACK signal is transmitted within four TTIs from time t5, which is the time the latest allocating information is transmitted, and therefore, scrambling section 303 scrambles with SC #2 (C1, C2) the two ACK signals (S1, S2) as response signals to retransmission data. That is, scrambling section 303 multiplies the two ACK signals S1 and S2 by 1 and 1, respectively. Consequently, the response signals fed back from base station 300 are S1×1 and S2×1.

Mobile station 2 retransmitted uplink data at time t11, and therefore determines that the two response signals fed back from base station 300 at time t13 are for mobile station 2 and receives the response signals. Further, mobile station 2 retransmitted the uplink data at time t11, and therefore descrambles with SC #1 (C1, C2) these response signals, as these response signals are responses to retransmission data. Mobile station 2 identifies the response signals fed back from base station 300 at time t13 as ACK signals, and therefore stops transmitting uplink data until mobile station 2 receives allocating information for mobile station 2 the next time.

In this way, according to the present embodiment, in ARQ in which a plurality of mobile stations share and use one channel for response signals, even when the mobile station receives an ACK signal as a NACK signal by mistake, it is possible to prevent failure of ARQ control.

In the case where the repetition factor is equal to or more than three, by matching the number of chips of the scrambling codes with the repetition factor, the present invention can be also implemented as described above.

Further, the codes used as scrambling codes for the initial transmission and scrambling codes for retransmission are not limited to ones that are completely orthogonal to each other. For example, all chips of the scrambling code for the initial transmission may be "1," and all chips of the scrambling code for retransmission may be "−1." In this way, the codes used as the scrambling code for the initial transmission and the scrambling code for retransmission may identify the same response signal as different contents between mobile stations.

Figure 26:
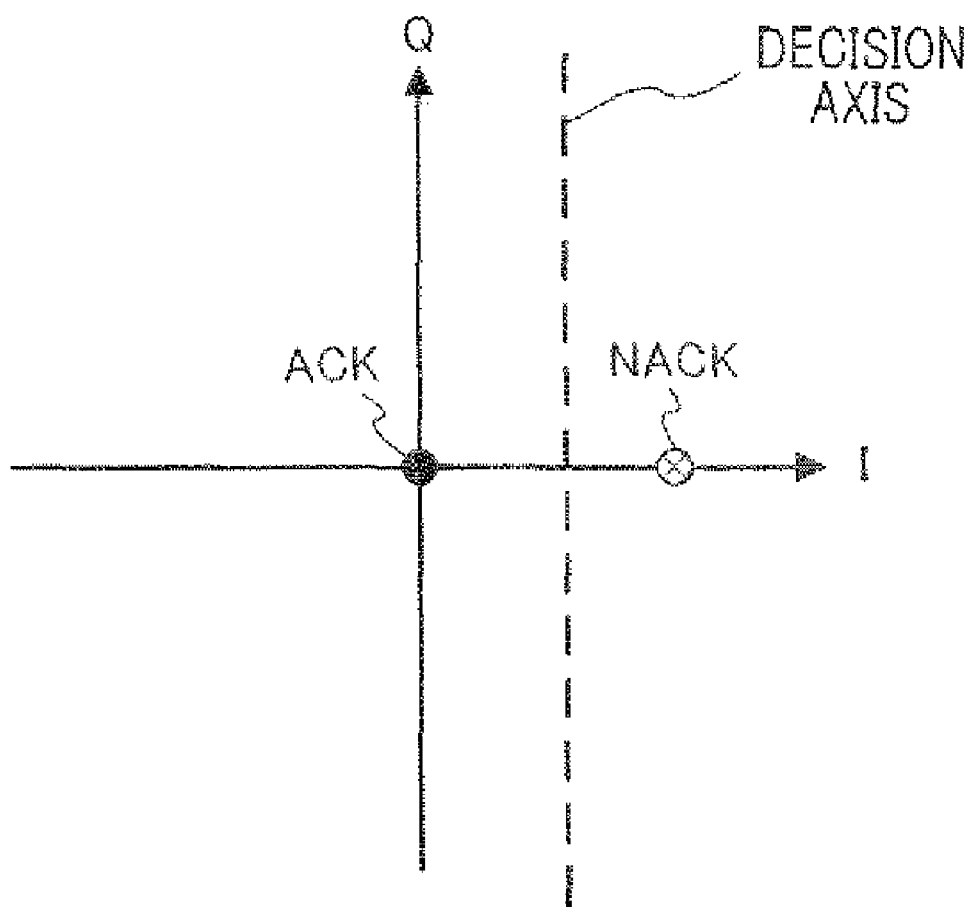
FIG. 26 illustrates another decision example according to Embodiment 4.

Further, in the case where either an ACK signal or a NACK signal is used as a response signal, that is, OOK (On/Off Keying) is used, the present invention can be implemented as described above. For example, when NACK signals alone are used as response signals, mobile station 400 may determine the response signal according to the decision axis shown in FIG. 26. That is, demodulation section 404 in mobile station 1 determines the response signal after combination according to the decision axis shown in FIG. 26. Accordingly, mobile station 1 can determine that the response signal (NACK signal) from base station 300 for mobile station 2 is an ACK signal. Consequently, as described above, mobile station 1 does not retransmit uplink data at time t11, and can stop transmitting uplink data by mistake.

Further, as shown in FIG. 27, the scrambling codes may be changed depending on the number of times uplink data is retransmitted. That is, the scrambling codes are made different between the initial transmission and retransmission, and, furthermore, the scrambling codes may be made different between a plurality of retransmissions. In the example shown in FIG. 27, the scrambling code for the initial transmission is SC #1=(1, 1, 1, 1), the scrambling code for the first retransmission is SC #2=(1, 1, −1, −1), the scrambling code for a second retransmission is SC #3=(1, −1, 1, −1), and the scrambling code for a third retransmission is SC #4=(1, −1, −1, 1). By this means, for example, in FIG. 20, even when mobile station 1 misidentified the response signal fed back from the base station at time t9 for a NACK signal, mobile station 1 can use different scrambling codes from the scrambling code used at time t9, and it is possible to prevent failure of ARQ control.

Further, in the case where a channel number for a response signal is reported from the base station to the mobile stations using allocating information, the present invention can be implemented as described above. Further, in the case where the channel numbers for response signals and RE numbers are associated in one-to-one correspondence, the channel numbers for response signal and control channel numbers are associated in one-to-one correspondence, or the channel numbers for response signals and CCE (Control Channel Elements) numbers to which allocating information is mapped, are associated in one-to-one correspondence, the present invention can be implemented as described above. Further, channels for response signals may be referred to as "ACK/NACK channel (ACK/NACK CH)." For example, FIG. 28 (in the case of two mobile stations) and FIG. 29 (in the case of three mobile stations) show sequence examples where the CCE numbers and ACK/NACK CH numbers are associated in one-to-one correspondence. Hereinafter, only the difference from FIG. 20 will be described.

Figure 28:
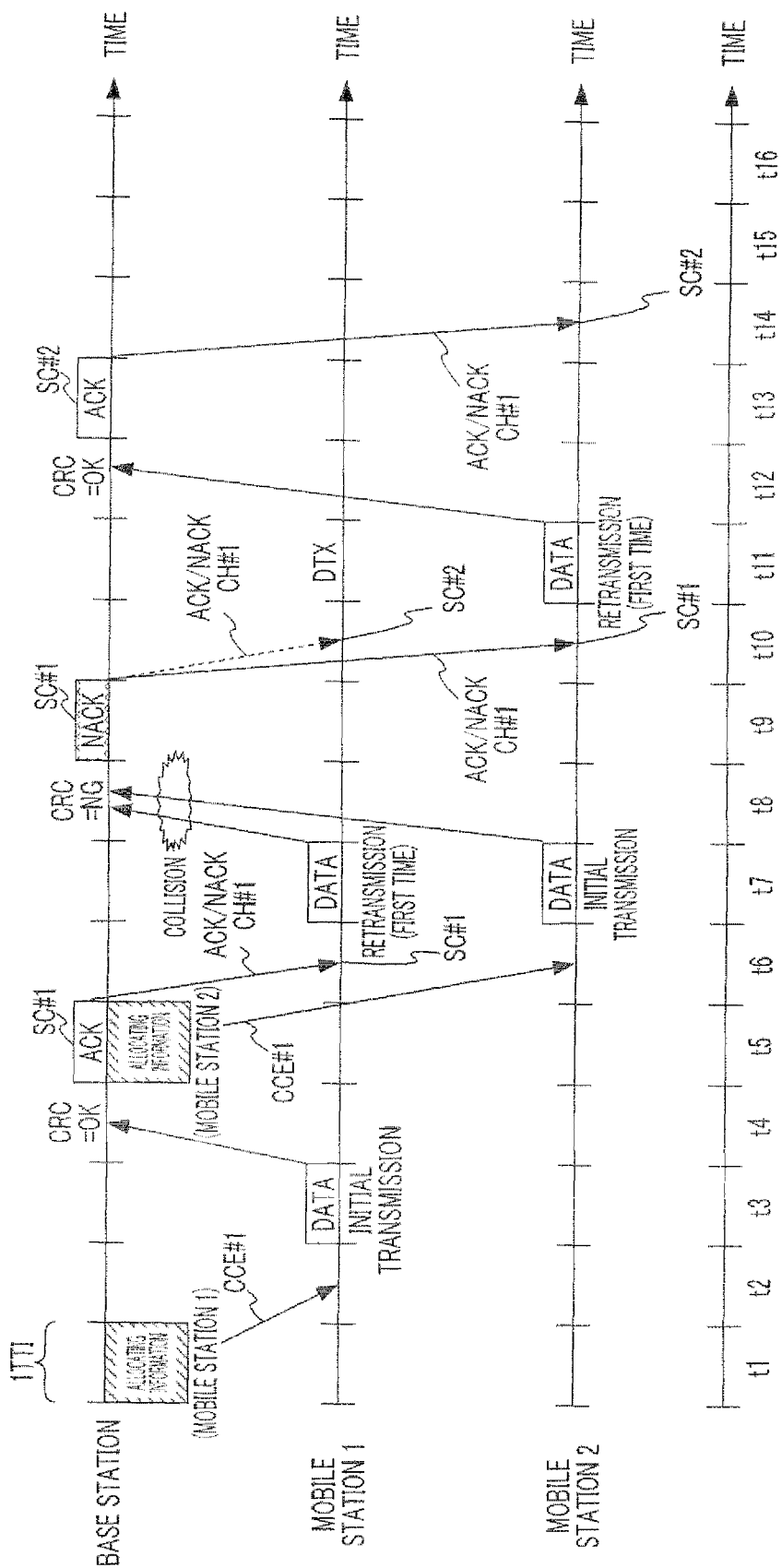
FIG. 28 is an example of another ARQ sequence (in the case of two mobile stations) according to Embodiment 4.

In FIG. 28, base station 300 received uplink data from mobile station 1 at time t4 transmits allocating information for mobile station 1 at time t1 using CCE #1, and therefore transmits the response signal at time t5 using ACK/NACK CH #1 associated with CCE #1. Further, base station 300 transmitted allocating information for mobile station 2 using CCE #1, and therefore transmits the response signal at time t9 and the response signal at time t13 using ACK/NACK CH #1.

In FIG. 28, similar to FIG. 20, mobile station 1 receives the response signal for mobile station 2 and can determine the response signal as DTX, and therefore, mobile station 1 determines that mobile station 1 has misidentified the ACK signal at time t6 for a NACK signal. That is, mobile station 1 does not retransmit uplink data at time t11. Consequently, mobile station can stop transmitting uplink data by mistake.

Figure 29:
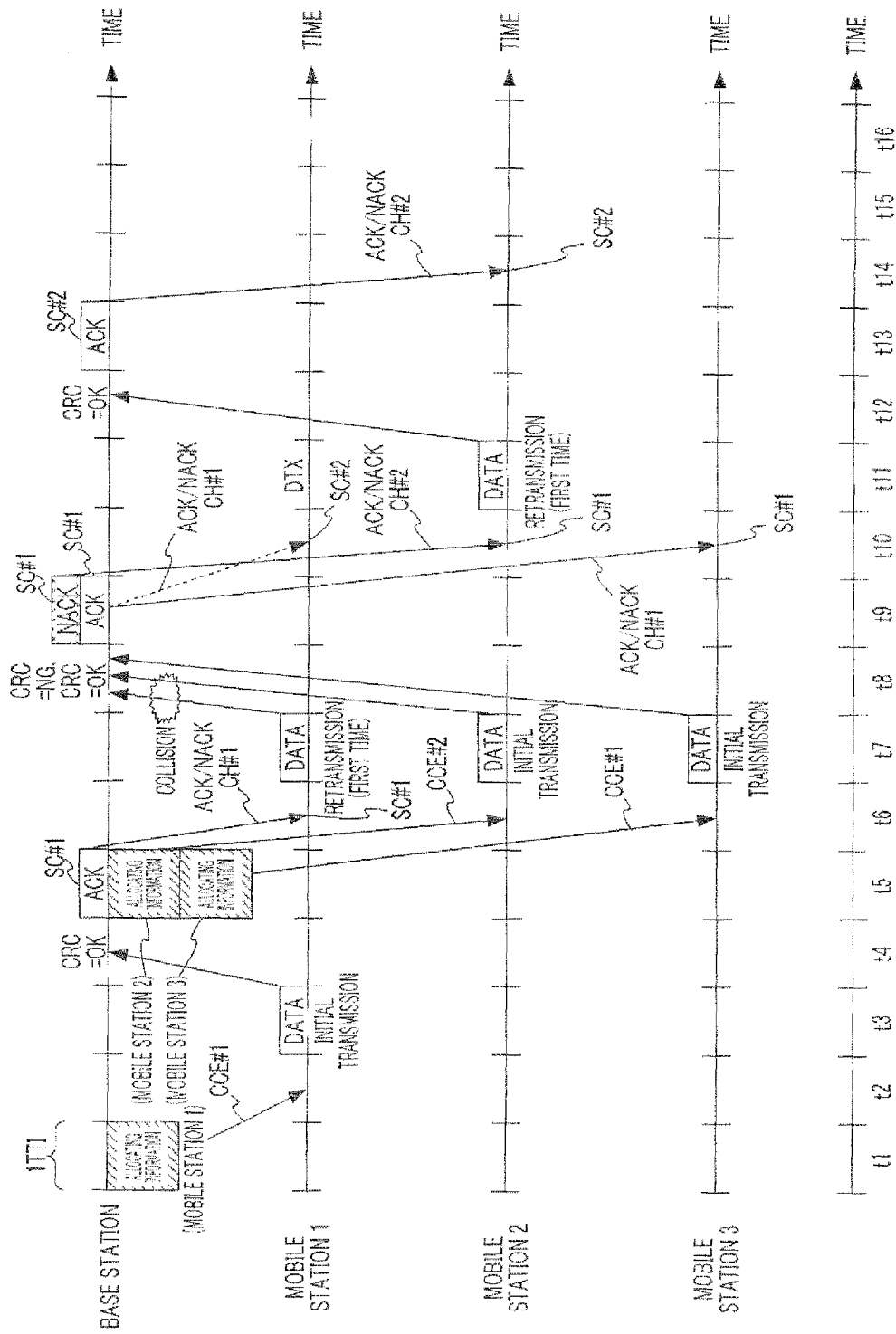
FIG. 29 is an example of another ARQ sequence (in the case of three mobile stations) according to Embodiment 4.

In FIG. 29, base station 300 received uplink data from mobile station 1 at time t4 transmits allocating information for mobile station 1 at time ti using CCE #1, and therefore transmits the response signal at time t5 using ACK/NACK CH #1 associated with CCE #1. Further, base station 300 transmitted allocating information for mobile station 2 using CCE #2, and therefore transmits the response signal at time t9 and the response signal at time t13 using ACK/NACK CH #2. Further, base station 300 transmitted allocating information for mobile station 3 using CCE #1, and therefore transmits the response signal at time t9 using ACK/NACK CH #1.

In FIG. 29, similar to FIG. 20, mobile station 1 receives the response signal for mobile station 3 and can determine the response signal as DTX, and therefore, mobile station 1 determines that mobile station 1 has misidentified the ACK signal at time t6 for a NACK signal. That is, mobile station 1 does not retransmit uplink data at time t11. Consequently, mobile station can stop transmitting uplink data by mistake.

Embodiments of the present invention have been explained.

The present invention can be implemented in modulation schemes other than the modulation schemes shown in the embodiments, for example, in communication systems using OOK (On/Off Keying) modulation and so on.

Further, as in the above embodiments, the present invention can be implemented in communication systems using modulation schemes in which a constellation of BPSK or QPSK where signal points are allocated on the Q axis is used as a constellation of BPSK.

Further, as in the above embodiments, the present invention can be also implemented in cases of using a stop signal that commands to stop transmitting uplink data and a re-transmit signal that commands to restart transmitting uplink data, as response signals.

Further, with the above embodiments, by using the QPSK scheme as a modulation scheme for response signals, two response signals may be multiplexed to one symbol.

Further, as described above, the present invention can be implemented in communication systems where three values, that is, ACK, NACK and Null, are determined. In these communication systems, above mobile station 1 may determine the NACK signal transmitted at time t9 as an ACK signal or a Null signal.

Further, with the above embodiments, by duplicating response signals (repetition), it is possible to obtain diversity effect of response signals.

Further, in the case where, for example, while retransmitting uplink data, uplink data channel is reallocated between the first retransmission and a second retransmission, the response signal to the first retransmission data after the reallocation may be modulated and demodulated according to the constellation pattern for response signals to the initial transmission data, or, may be scrambled or descrambled with the scrambling code for the initial transmission. By this means, the constellation pattern (or scrambling code) for a response signal to the first retransmission data after the reallocation, and the constellation pattern (or scrambling code) of a response signal to retransmission data in response to the NACK signal can be made different. Consequently, even when channel numbers for response signals change by reallocating the uplink data channels, as in the above embodiments, it is possible to prevent failure of ARQ control.

Channels for response signals may be referred to as "ACK/NACK channel," "ACK/NAK channel" and "RICH (Hybrid ARQ Indicator Channel)."

A base station, a mobile station and a subcarrier may be referred to as a "Node B," a "UE," and a "tone," respectively. A CP may be referred to as a "guard interval (GI)."

Further, the transform method between the frequency domain and the time domain is not limited to the IFFT and FFT.

Further, the error detection method is not limited to a CRC.

Although cases have been explained with the embodiments above as examples where the downlink communication scheme is the OFDM scheme, the downlink communication scheme is not particularly limited in the present invention.

Further, to improve received quality, the response signal may be spread, duplicated and so on. In this case, it is possible to implement the present invention as described above.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-024636, filed on Feb. 2, 2007, Japanese Patent Application No. 2007-151658, filed on Jun. 7, 2007, and Japanese Patent Application No. 2007-211546, filed on Aug. 14, 2007, including the specifications, drawings and abstracts, are incorporated herein by reference in their entirety.

INDUSTRIAL APPLICABILITY

The present invention is applicable to, for example, mobile communication systems.

The invention claimed is:

1. A radio communication base station apparatus comprising:
    a circuit, the circuit comprising:
        an error detection section that performs error detection, and generates a first response signal in response to initial transmission data and a second response signal in response to retransmission data; and
        a modulation section that modulates the first response signal and the second response signal by mapping each of the first response signal and the second response signal to a decision region in a constellation, wherein: the decision region to which the second response signal is mapped is the same as the decision region to which the first response signal is mapped when the second response signal represents different content from the first response signal, and the decision region to which the second response signal is mapped is different from the decision region to which the first response signal is mapped when the second response signal represents the same content as the first response signal.

2. The radio communication base station apparatus according to claim 1, wherein the modulation section modulates the first response signal and the second response signal by inversing, between the first response signal and the second response signal, the decision region in the constellation.

3. The radio communication base station apparatus according to claim 1, wherein:
    the error detection section generates an acknowledgment signal as the first response signal, and a negative acknowledgment signal as the second response signal; and
    the modulation section maps, in the constellation, the negative acknowledgment signal, in response to the retransmission data, to the decision region where the acknowledgment signal in response to the initial transmission data is mapped.

4. The radio communication base station apparatus according to claim 1, wherein:
    the error detection section generates a negative acknowledgment signal as the first response signal, and an acknowledgment signal as the second response signal; and
    the modulation section maps, in the constellation, the acknowledgment signal, in response to the retransmission data, to the decision region where the negative acknowledgment signal in response to the initial transmission data is mapped.

5. A radio communication mobile station apparatus comprising:
    a circuit, the circuit comprising:
        a receiving section that receives a first response signal in response to initial transmission data and a second response signal in response to retransmission data; and
        a demodulation section that demodulates each of the first response signal and the second response signal using a decision region to which each of the first response signal and the second response signal is mapped in a constellation, wherein: the decision region to which the second response signal is mapped is the same as the decision region to which the first response signal is mapped when the second response signal represents different content from the first response signal, and the decision region to which the second response signal is mapped is different from the decision region to which the first response signal is mapped when the second response signal represents the same content as the first response signal.

6. A response signal mapping method using an apparatus, said apparatus implementing a step comprising:
    mapping each of a first response signal in response to an initial transmission data and a second response signal in response to retransmission data to a decision region in a constellation,
    wherein: the decision region to which the second response signal is mapped is the same as the decision region to which the first response signal is mapped when the second response signal represents different content from the first response signal, and the decision region to which the second response signal is mapped is different from the decision region to which the first response signal is mapped when the second response signal represents the same content as the first response signal.

* * * * *